US008670128B2

(12) United States Patent
Kannaka et al.

(10) Patent No.: US 8,670,128 B2

(45) Date of Patent: Mar. 11, 2014

(54) PROFILE MEASURING APPARATUS

(75) Inventors: Masato Kannaka, Kobe (JP); Eiji Takahashi, Kobe (JP); Masakazu Kajita, Kobe (JP)

(73) Assignee: Kobe Steel, Ltd., Kobe-shi, Hyogo (JP)

(*) Notice: Subject to any disclaimer, the term of this patent is extended or adjusted under 35 U.S.C. 154(b) by 430 days.

(21) Appl. No.: 13/138,247

(22) PCT Filed: Jan. 26, 2010

(86) PCT No.: PCT/JP2010/050972

§ 371 (c)(1), (2), (4) Date: Jul. 22, 2011

(87) PCT Pub. No.: WO2010/087337

PCT Pub. Date: Aug. 5, 2010

(65) Prior Publication Data

US 2011/0279822 A1 Nov. 17, 2011

(30) Foreign Application Priority Data

Feb. 2, 2009 (JP) ................................ 2009-021290
Jan. 15, 2010 (JP) ................................ 2010-006653

(51) Int. Cl.
*G01B 9/02* (2006.01)

(52) U.S. Cl.
USPC ............................ 356/503; 356/485; 356/489

(58) Field of Classification Search
USPC .......... 356/484–487, 489, 503–504, 632, 630
See application file for complete search history.

(56) References Cited

U.S. PATENT DOCUMENTS

2005/0225770 A1 10/2005 Chapman et al.

FOREIGN PATENT DOCUMENTS

DE 103 31 966 A1 2/2005
DE 10 2007 010 387 A1 9/2008

(Continued)

OTHER PUBLICATIONS

International Search Report for PCT/JP2010/050972, mailed Apr. 20, 2010.
Office action from German Patent Office in a counterpart Application No. DE 11 2010 000 808.6 filed Jan. 22, 2013.
International Search Report issued by the Japanese Patent Office on Apr. 20, 2010, in International Application No. PCT/JP2010/050972 (2 pages).

*Primary Examiner* — Gregory J Toatley
*Assistant Examiner* — Maurice Smith
(74) *Attorney, Agent, or Firm* — Stites & Harbison PLLC; Juan Carlos A. Marquez, Esq.

(57) ABSTRACT

A shape determining device (X) splits the original light beam from a light source (Y) into two light beams, directs the light beams to the front and back surfaces of the object (1) to be determined, and performs optical heterodyne interference using the split light beams at the front and back surfaces of the object (1) to be determined. In the shape determining device (X), each of the split light beams is further split into a main light beam and a subordinate light beam, the subordinate light beam interferes with the main light beam at each of the front and back surfaces before and after the illumination of the object (1) to be determined, the signals after the interference are phase-detected, and the difference between the phases acquired by the phase detection is detected at each of the front and back surfaces of the object (1) to be determined. In the shape determining device (X), optical modulation for performing the optical heterodyne interference is performed before the optical heterodyne interference of the split light beams after the split light beams are directed to the front and back surfaces of the object (1) to be determined. Furthermore, in the shape determining device (X), a measurement optical system before the phase detection and after the split light beams are directed to the front and back surfaces of the object (1) to be determined is maintained integrally.

12 Claims, 20 Drawing Sheets

(56) References Cited

FOREIGN PATENT DOCUMENTS

| | | | | |
|---|---|---|---|---|
| JP | 2002-005640 | | | 1/2002 |
| JP | 2002-318107 | | | 10/2002 |
| JP | 2007-504444 | | | 3/2007 |
| JP | 2008-180708 | | | 8/2008 |
| JP | 2008180708 | A | * | 8/2008 |
| JP | 2009-8421 | | | 1/2009 |
| JP | 2009-80038 | | | 4/2009 |
| JP | 2010-008150 | | | 1/2010 |
| KR | 1020060037456 | A | | 5/2006 |

* cited by examiner (A)

THREE POINTS (B)

FIVE POINTS (C)

NINE POINTS

PROFILE MEASURING APPARATUS

TECHNICAL FIELD

The present invention relates to a profile measuring apparatus that measures a profile of a workpiece such as a semiconductor wafer in a non-contact manner by optical interferometry.

BACKGROUND ART

When a profile of a thin-plate-like semiconductor wafer (an example of a workpiece, hereinafter referred to as wafer) is measured, a non-contact profile measuring apparatus using an interferometer is being widely used. The apparatus receives an interfering light containing a measurement light that is a reflected light when one of two branched light beams is reflected by a surface of a workpiece and a reference light that is a reflected light when the other light beam is reflected by a predetermined reference surface, and obtains a surface profile (surface height distribution) of the workpiece from an interference image that is formed based on the interfering light. Hence, since the surface profile of the wafer can be measured in a non-contact manner, the surface profile can be measured without a scratch or the like being generated on the surface of the wafer unlike when the profile is measured with a profile measuring instrument with a stylus. When the profile of the wafer is measured, the profile of the entire surface has to be measured. Hence, the measurement is generally performed while a circumferential edge portion of the wafer is supported (generally by three-point support).

Meanwhile, if the thin-plate-like workpiece (for example, with a thickness smaller than 1 mm) such as the wafer is supported only at the edge portion, the wafer vibrates with a slight wind pressure or by vibration or the like of other machines. The vibration has a non-negligible amplitude in the profile measurement for the wafer because the profile measurement needs extremely high measurement accuracy (for example, with an error of 20 nm or smaller). To prevent such vibration of the wafer, PTL 1 describes a method of restricting a wafer from vibrating by arranging a transparent rigid body near the wafer. However, this method has a problem such that an interfering light may be disordered because the transparent rigid body is inserted into an optical path. Also, PTL 2 describes a profile measuring apparatus that branches two-type measurement lights with slightly different frequencies into two lights, guides the lights to heterodyne interferometers at front and back surfaces of a workpiece, and measures a thickness of the workpiece by reversing the relationship between an object light and a reference light by the front and back heterodyne interferometers. With the technique described in PTL 2, by obtaining a difference between detection signals of the front and back heterodyne interferometers, the effect of displacement of the workpiece due to the vibration is eliminated, and the thickness can be measured with high accuracy without being affected by the vibration of the workpiece. Further, PTL 2 describes that the branched lights of the two-type measurement lights immediately before the lights are incident on the front and back heterodyne interferometers interfere with each other, and an intensity signal of the interfering light is used as a reference signal for the detection signals of the heterodyne interferometers. Accordingly, a measurement error resulted from fluctuation in phases of the two-type measurement lights generated in optical paths from a light source toward the two heterodyne interferometers can be eliminated.

However, even with the technique described in PTL 2, if the phases of the two-type measurement lights in the optical paths from the light source to the two heterodyne interferometers fluctuate at high speed, a circuit for detecting the phases cannot properly follow the speed of change. For example, if the two-type measurement lights are transmitted from the light source to the two heterodyne interferometers through optical fibers, the optical fibers may vibrate at high speed depending on the surrounding environment, and the phases of the two-type measurement lights may fluctuate at high speed. Then, with the technique described in PTL 2, processing for eliminating the fluctuation in the phases of the two-type measurement lights by using the reference signal does not properly function. Hence, even with the technique descried in PTL 2, the measurement error resulted from the fluctuation in the phases of the two-type measurement lights may not be reliably eliminated.

CITATION LIST

Patent Literature

PTL 1: Japanese Unexamined Patent Application Publication No. 2002-5640

PTL 2: Japanese Unexamined Patent Application Publication No. 2008-180708

SUMMARY OF INVENTION

The present invention is made in light of the situations, and an object of the invention is to provide a profile measuring apparatus that can easily measure a thickness of a workpiece with high accuracy without being affected by vibration of the workpiece or vibration that is generated at a transmission medium of a measurement light from a light source to an interferometer. Another object of the invention is to provide a profile measuring apparatus that can measure a surface profile of a workpiece with further high accuracy.

A profile measuring apparatus according to the present invention is a profile measuring apparatus used for scanning front and back surfaces of a workpiece and measuring a thickness distribution of the workpiece in a non-contact manner. With this profile measuring apparatus, a source light that is emitted from a predetermined light source is branched into two lights; the branched two lights are guided to front and back surfaces of the workpiece; and optical heterodyne interference is performed by using the branched light at each of front and back of the workpiece. In the profile measuring apparatus, the branched light is further branched into a main light and a sub-light at each of the front and back of the workpiece; the sub-light interferes with the main light before the irradiation on the workpiece and the main light after the irradiation on the workpiece; phases of signals after the interference are detected; and a difference between the phases obtained by the phase detection is detected at each of the front and back of the workpiece. Also, in the profile measuring apparatus, optical modulation for performing the optical heterodyne interference is performed before the optical heterodyne interference is performed after the branched lights are guided to the front and back of the workpiece. Further, in the profile measuring apparatus, a measurement optical system after the branched lights are guided to the front and back of the workpiece and before the phase detection is integrally held. Accordingly, with such a profile measuring apparatus, a thickness of a workpiece can be easily measured with high accuracy without being affected by vibration of the workpiece or vibration of a transmission medium for a measurement light from a light source to an interferometer.

Also, a profile measuring apparatus according to the present invention measures a thickness of a workpiece by a one-surface measurement unit and a other-surface measurement unit that perform optical heterodyne interference. The surface measurement unit irradiates the workpiece with a plurality of measurement lights, and hence the profile measuring apparatus measures a surface profile of the workpiece 1. Accordingly, such a profile measuring apparatus can measure a surface profile of a workpiece with further high accuracy.

The above-described matters, other objects, features, and advantages of the present invention will be apparent with reference to the following detailed description and the accompanying drawings.

DESCRIPTION OF EMBODIMENTS

Figure 1:
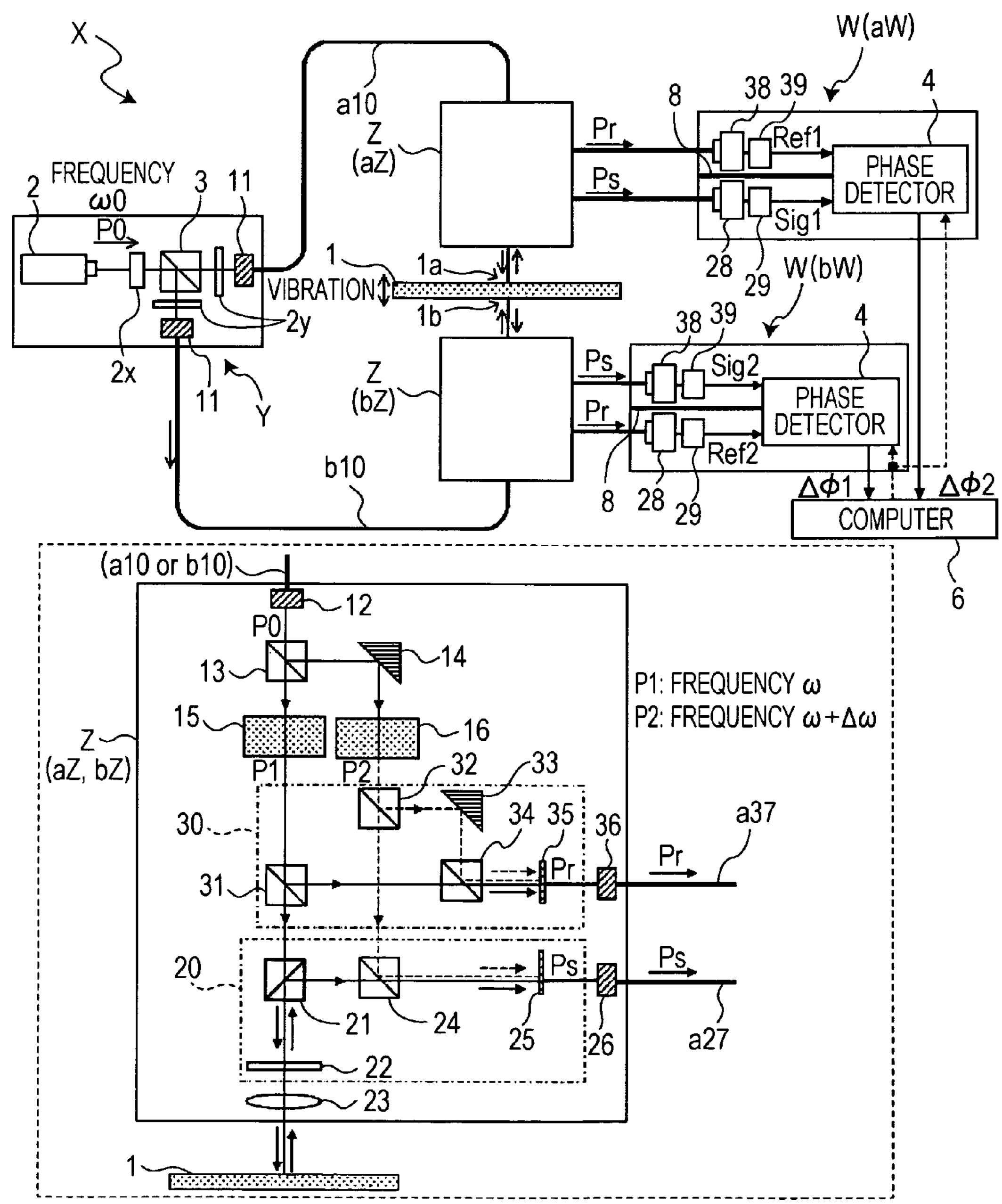
FIG. 1 is a configuration diagram of a profile measuring apparatus according to a first embodiment of the present invention.

Embodiments of the present invention will be described below based on the drawings. In the drawings, like reference signs refer like configurations, and redundant description is omitted. Also, in the description, when members are collectively described, the members are indicated by reference signs without auxiliary characters, and when individual configurations of such members are described, the members are indicated by reference signs with auxiliary characters. The embodiments described below are mere examples that implement the present invention, and hence do not intend to limit the technical scope of the present invention.

First Embodiment

A profile measuring apparatus X according to a first embodiment of the present invention will be described below with reference to a configuration diagram shown in FIG. 1. The profile measuring apparatus X is a measuring apparatus used for measuring a thickness of a thin-plate-like workpiece 1 such as a semiconductor wafer in a non-contact manner. As shown in FIG. 1, the profile measuring apparatus X includes a light source unit Y, measurement optical units Z (aZ, bZ) arranged to face each other at front and back surfaces of the workpiece 1, two phase detection circuits W (aW, bW) respectively provided for the measurement optical units Z (aZ, bZ), and a computer 6.

For convenience of the description, one surface (in an example shown in FIG. 1, an upper-side surface (upper surface)) of the workpiece 1 is named "A surface," and the other surface (in the example shown in FIG. 1, a lower-side surface (lower surface)) is named "B surface." Both surfaces (the A and B surfaces) have the front-and-back relationship. Also, a surface portion of the A surface at a measurement position for the thickness of the workpiece 1 is named A-surface measurement portion 1*a*, and a surface portion of the B surface facing the A-surface measurement portion 1*a* is named B-surface measurement portion 1*b*. Also, the measurement optical unit Z arranged to face the A surface is named A-surface measurement optical unit aZ, and the measurement optical unit Z arranged to face the B surface is named B-surface measurement optical unit bZ. Also, the phase detection circuit W provided for the A-surface measurement optical unit aZ is named A-surface phase detection circuit aW, and the phase detection circuit W provided for the B-surface measurement optical unit bZ is named B-surface phase detection circuit bW.

Though not shown in FIG. 1, the profile measuring apparatus X includes a support portion that supports (for example, by three-point supporting) a circumferential edge portion of the workpiece 1, and a moving mechanism that moves the support portion in two-dimensional directions (two-dimensional directions that are parallel to both measurement surfaces of the workpiece 1) and hence moves the workpiece 1 in the two-dimensional directions. The profile measuring apparatus X obtains measurement values while changing the positions of the A-surface measurement portion 1*a* and the B-surface measurement portion 1*b* of the workpiece 1 by moving the workpiece 1 by the moving mechanism.

The light source unit Y includes a single-wavelength laser light source 2 that emits a light beam P0, which is a predetermined coherent light, an isolator 2*x*, a non-polarization beam splitter 3, two wave plates 2*y*, and two optical-fiber connecting terminals 11. The single-wavelength laser light source 2 is a laser light source that outputs a single-wavelength laser light with a frequency ω0. For example, the short-wavelength laser light source 2 may be a helium-neon laser or the like that outputs laser light with a wavelength of 633 nm. Hereinafter, for convenience of the description, emitted light of the short-wavelength laser light source 2 is named source light P0. The beam splitter 3 is an example of the first optical branching means that branches the source light. P0 emitted from the single-wavelength laser light source 2, into two lights.

Also, the profile measuring apparatus X includes input optical fibers a10 and b10 that respectively guide the branched lights branched by the beam splitter 3 in directions toward the A-surface measurement portion 1*a* and the B-surface measurement portion 1*b* of the workpiece 1. More specifically, the one optical fiber a10 guides one of the branched lights to the A-surface measurement optical unit aZ arranged to face the A surface of the workpiece 1. Also, the other optical fiber b10 guides the other of the branched lights to the B-surface measurement optical unit bZ arranged to face the B surface of the workpiece 1. The optical fibers a10 and b10 are polarization maintaining optical fibers. Accordingly, polarization planes of the branched lights transmitted by the optical fibers a10 and b10 are maintained to be constant without being disordered in the mid course. Alternatively, optical guiding means such as mirrors may be provided instead of the optical fibers a10 and b10. In this case, however, adjustment for optical paths of the branched lights of the source light P0 may be troublesome.

The optical-fiber connecting terminals 11 are terminals to which one ends of the optical fibers a10 and b10 are respectively connected. The wave plates 2*y* are optical elements that are respectively arranged between the beam splitter 3 and light inlets of the optical fibers a10 and b10, and that adjust the polarization planes (polarization directions) of the branched lights input to the optical fibers a10 and b10. The isolator 2*x* is an optical element that is arranged between the single-wavelength laser light source 2 and the beam splitter 3 and that prevents a reflected light from the beam splitter 3 or the inlets or the like of the optical fibers a10 and b10 from being returned to the single-wavelength laser light source 2. The isolator 2*x* can prevent that the reflected light is returned to the single-wavelength laser light source 2 and the emitted light of the single-wavelength laser light source 2 becomes unstable.

Also, as shown in FIG. 1, the measurement optical units Z each include an input optical-fiber connecting terminal 12, a first non-polarization beam splitter 13, two acoustooptic elements 15 and 16, a heterodyne interferometer 20, a reference interferometer 30, and two output optical-fiber connecting terminals 26 and 36. The optical-fiber connecting terminal 12 is a terminal to which one end of each of the optical fibers a10 and b10 that are connected to the light source unit Y is connected. The branched light of the source light P0 of the light source unit Y is introduced to the measurement optical unit Z through the optical-fiber connecting terminal 12.

The beam splitter 13 is an example of the second optical branching means that further branches each of the branched lights of the source light P0, the branched lights which are guided in the directions toward the measurement portions 1*a* and 1*b* at the front and back of the workpiece 1 by the optical fibers a10 and b10, into two lights. Also, the acoustooptic elements 15 and 16 are examples of optical modulating means that perform frequency modulation for the branched lights branched by the beam splitter 13 at each of the front and back of the workpiece 1, and generate two measurement lights P1 and P2 with different frequencies. For example, one of the modulation frequencies of the two acoustooptic elements 15 and 16 may be about 80 MHz, and the other of the modulation frequencies may be about 81 MHz. The two-type measurement lights P1 and P2 are single-wavelength light beams. The frequencies (ω, ω+Δω) of the measurement lights P1 and P2 are not particularly limited. For example, a difference Δω between the frequencies of both light beams is in a range from about several tens of kilohertz to several megahertz.

Also, the heterodyne interferometer 20 is an interferometer that irradiates the measurement portion 1*a* or 1*b* with the one measurement light P1 at each of the front and back of the workpiece 1 and that causes an object light that is the measurement light P1 reflected by the measurement portion to interfere with a reference light that is the other measurement light P2. The heterodyne interferometer 20 is provided for each of the two measurement optical units Z. As shown in FIG. 1, the heterodyne interferometer 20 includes a polarization beam splitter 21, a ¼ wave plate 22, a non-polarization beam splitter 24, and a polarization plate 25. The polarization beam splitter 21 transmits the one measurement light P1 in the direction toward the measurement portion 1*a* or 1*b* and reflects the object light that is the measurement light P1 and is reflected by the measurement portion 1*a* or 1*b*, in a predetermined direction. The ¼ wave plate 22 is arranged between the polarization beam splitter 21 and the measurement portion 1*a* or 1*b*. The presence of the ¼ wave plate 22 switches a polarization state (P-polarized light or S-polarized light) of the measurement light P1 directed from the polarization beam splitter 21 toward the measurement portion 1*a* or 1*b*, and a polarization state of the object light that is the measurement light P1 reflected by the measurement portion 1*a* or 1*b* and being incident on the polarization beam splitter 21. Also, the measurement optical unit Z includes a condenser lens 23 arranged to face a surface of the workpiece 1. The condenser lens 23 condenses the measurement light P1 at the measurement portion 1*a* or 1*b*, and causes the object light reflected by the measurement portion 1*a* or 1*b* to be incident on the polarization beam splitter 21 along the optical axis of a first path of the round trip. The beam splitter 24 aligns the optical axis of the object light that is the reflected light from the measurement portion 1*a* or 1*b* of the one measurement light P1, with the optical axis of the reference light that is the other measurement light P2, and guides the lights in the same direction. Also, the polarization plate 25 is an optical element that receives as an input the object light and reference light with the optical axes being aligned by the beam splitter 24, extracts a polarization component in the same direction, and outputs an interfering light Ps of the object light and reference light. Hereinafter, the interfering light Ps of the object light and reference light obtained by the heterodyne interferometer 20 is named measurement interfering light Ps. If required, the heterodyne interferometer 20 may be provided with a direction-changing element such as a mirror that changes a direction of one of or both optical paths of the two measurement lights P1 and P2.

Also, at each of the front and back of the workpiece 1, the reference interferometer 30 is an interferometer that branches each of the measurement lights P1 and P2 into two lights of a main light, which is input to the heterodyne interferometer 20, and a sub-light, which is other than the main light, and that causes the two sub-lights to interfere with each other. As shown in FIG. 1, the reference interferometer 30 includes three non-polarization beam splitters 31, 32, and 34, and a polarization plate 35. The beam splitters 31 and 32 each are an example of third optical branching means that branches each of the measurement lights P1 and P2 into two lights including a main light, which is input to the heterodyne interferometer 20, and a sub-light, which is other than the main light, at each of the front and back of the workpiece 1. Also, the beam splitter 34 is an optical element that aligns the optical axes of the two sub-lights, which are the divided lights of the measurement lights P1 and P2 by the beam splitters 31 and 32, with each other and guides the sub-lights in the same direction. The polarization plate 35 is an optical element that receives as an input the two sub-lights with the optical axes being aligned by the beam splitter 34, extracts a polarization component in the same direction, and outputs an interfering light Pr of the two sub-lights. The beam splitter 34 and the polarization plate 35 are an example of sub-light interference means that causes the two sub-lights to interfere with each other at each of the front and back of the workpiece 1. Hereinafter, the interfering light Pr of the two sub-lights obtained by the reference interferometer 30 is named reference interfering light Pr. If required, the reference interferometer 30 is provided with an optical element such as a mirror that changes a direction of one of or both the two sub-lights. The reference interferometer 30 shown in FIG. 1 includes a mirror 33 that changes the direction of the branched light of the measurement light P2.

The one output optical-fiber connecting terminal 26 is a terminal to which one end of an optical fiber a27 or b27 for transmitting the measurement interfering light Ps to a measurement optical detector b28 (described later) is connected. The one optical fiber a27 transmits the measurement interfering light Ps at the A surface of the workpiece 1. The other optical fiber b27 transmits the measurement interfering light Ps at the B surface of the workpiece 1. The other output optical-fiber connecting terminal 36 is a terminal to which one end of an optical fiber a37 or b37 for transmitting the reference interfering light Pr to a reference optical detector b38 (described later) is connected. The one optical fiber a37 transmits the reference interfering light Pr at the A surface of the workpiece 1. The other optical fiber b37 transmits the reference interfering light Pr at the B surface of the workpiece 1. The wavefronts of the measurement interfering light Ps and reference interfering light Pr do not have to be particularly maintained in their transmission paths. The output optical fibers a27, a37, b27, and b37 employ typical multi-mode optical fibers. Alternatively, the optical fibers a27, a37, b27, and b37 may employ single-mode optical fibers. In general, a multi-mode optical fiber has a larger fiber core diameter than a single-mode optical fiber. The optical axis of propagating light can be easily adjusted, and light with a large quantity can propagate. Therefore, since the multi-mode optical fiber is advantageous in the optical-axis adjustment and the light quantity of propagating light, the optical fibers a27, a37, b27, and b37 preferably use the multi-mode optical fibers.

Also, as shown in FIG. 1, the phase detection circuit W includes a measurement optical detector 28, a reference optical detector 38, amplifiers 29 and 39 for amplifying signals of the measurement system and the reference system, a phase detector 4, and a shield plate 8. The measurement optical detector 28 is a photoelectric conversion element that receives the measurement interfering light Ps obtained by the heterodyne interferometer 20 and outputs an intensity signal Sig1 or Sig2 of the measurement interfering light Ps. The intensity signal Sig1 is a signal obtained at the A surface of the workpiece 1. The signal intensity Sig2 is a signal obtained at the B surface of the workpiece 1. Hereinafter, the intensity signals Sig1 and Sig2 are named measurement beat signals Sig1 and Sig2. Also, the reference optical detector 38 is a photoelectric conversion element that receives the reference interfering light Pr obtained by the reference interferometer 30 and outputs an intensity signal Ref1 or Ref2 of the reference interfering light Pr. The intensity signal Ref1 is a signal obtained at the A surface of the workpiece 1. The signal intensity Ref2 is a signal obtained at the B surface of the workpiece 1. Hereinafter, the intensity signals Ref1 and Ref2 are named reference beat signals Ref1 and Ref2.

The phase detector 4 is an electronic component that performs phase detection for two beat signals including the measurement beat signal Sig1 or Sig2, which is the output signal of the measurement optical detector 28, and the reference beat signal Ref1 or Ref2, which is the output signal of the reference optical detector 38, and that detects a phase difference ΔΦ1 or ΔΦ2 of the two beat signals. In particular, the phase detector 4 in the A-surface phase detection circuit aW detects the phase difference ΔΦ1 between the measurement beat signal Sig1 and the reference beat signal Ref1. Also, the phase detector 4 in the B-surface phase detection circuit bW detects the phase difference ΔΦ2 between the measurement beat signal Sig2 and the reference beat signal Ref2. A difference (ΔΦ1-ΔΦ2) between the phase difference of the two beat signals obtained at the front of the workpiece 1 and the phase difference of the two beat signals obtained at the back of the workpiece 1 is a measurement value indicative of a thickness of the workpiece 1. Also, the two phase detectors 4 at the A surface and B surface simultaneously perform the phase detection of the two beat signals at the front and the phase detection of the two beat signals at the back in synchronization with a synchronizing signal that is output from the computer 6. Accordingly, the difference (ΔΦ1-ΔΦ2) between the phase difference of the two beat signals at the front and the phase difference of the two beat signals at the back indicates the thickness of the workpiece 1 without being affected by vibration of the workpiece 1. The phase detector 4 may employ, for example, a lock-in amplifier or the like. The phase detector 4 is an example of the phase information detecting means.

The shield plate 8 is a metal plate arranged between a signal transmission path from the measurement optical detector 28 to the phase detector 4, and a signal transmission path from the reference optical detector 38 to the phase detector 4. If the measurement optical detector 28, the reference optical detector 38, and the phase detector 4 are arranged close to each other for making the apparatus compact, extraneous radiation of electromagnetic waves generated from the one beat-signal transmission path interferes as a noise with the other beat signal, and degrades measurement accuracy. To provide profile measurement accuracy on the order of sub-nanometers, the noise component of mutual interference due to the extraneous radiation has to be less than 0.5% of the signal component. The presence of the shield plate 8 can prevent that the measurement accuracy is degraded due to the extraneous radiation. Also, to suppress the mutual interference due to the extraneous radiation, an interval between the two beat-signal transmission paths is desirably about 20 mm or larger.

Also, the computer 6 executes thickness-calculating processing that calculates a measurement value of the thickness of the workpiece 1 corresponding to the difference (ΔΦ1–ΔΦ2) between the phase difference, which is between the two beat signals obtained at the front of the workpiece 1, and the phase difference, which is between the two beat signals obtained at the back. More specifically, the computer 6 substitutes the phase differences $\Delta\Phi\mathbf{1}$ of the two beat signals at the front and $\Delta\Phi\mathbf{2}$ of the two beat signals at the back into Expression F1, and hence calculates a measurement value Ds for the thickness of the workpiece 1.

$$Ds=(\Delta\Phi\mathbf{1}-\Delta\Phi\mathbf{2})\times(\lambda/2)/(2\pi) \quad \text{(F1)}$$

In Expression F1, λ is a wavelength of the measurement light P1. Also, Expression F1 is an expression based on approximation that the wavelength of the measurement light P2 is equivalent to the wavelength of the measurement light P1. Further, Expression 1 is an expression when the relationship how the object light and reference light are allocated to the two measurement lights P1 and P2 in the measurement optical unit Z at the A surface is the same as the relationship in the measurement optical unit Z at the B surface, i.e., when the relationship between the frequency of the object light and the frequency of the reference light at the A surface is the same as the relationship at the B surface. In contrast, when the condition how the object light and reference light are allocated to the two measurement lights P1 and P2 in the measurement optical unit Z at the A surface is a reversal of the relationship in the measurement optical unit Z at the B surface, i.e., when the relationship between the frequency of the object light and the frequency of the reference light at the A surface is a reversal of the relationship at the B surface, a calculation expression of the measurement value Ds for the thickness of the workpiece 1 becomes Expression F2 as follows.

$$Ds=(\Delta\Phi\mathbf{1}+\Delta\Phi 2)\times(\lambda/2)/(2) \quad \text{(F2)}$$

Figure 2:
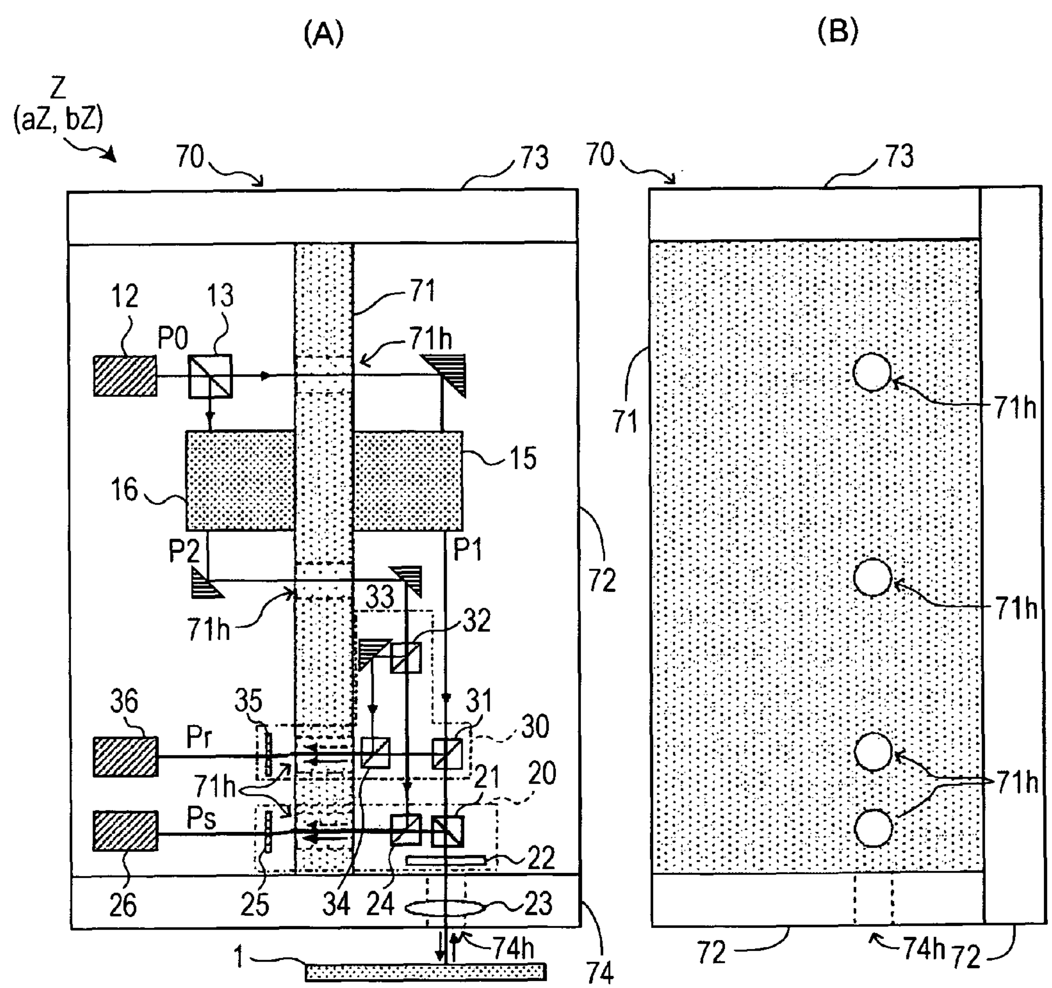
FIG. 2 is a brief configuration diagram of an example of a measurement optical unit included in the profile measuring apparatus shown in FIG. 1.

Next, a specific example of the structure of the measurement optical unit Z will be described with reference to FIG. 2. FIG. 2 is a brief configuration diagram of an example of the measurement optical unit Z. FIG. 2(A) is a side view of the measurement optical unit Z. FIG. 2(B) is a side view of the optical-system holder 70 when viewed in a direction different from a viewing direction of the side view (A) by 90°. In FIG. 2, the same reference sings refer the same components as those shown in FIG. 1. The respective optical elements included in the measurement optical unit are integrally held by the predetermined optical-system holder 70 at each of the front and back of the workpiece 1. Hereinafter, the devices included in the measurement optical unit, i.e., the devices that form the optical-fiber connecting terminals 12, 26, and 36, the beam splitter 13, the acoustooptic elements 15 and 16, the heterodyne interferometer 20, and the reference interferometer 30, as well as the condenser lens 23 are collectively named measurement optical system. The optical-system holder 70 is a rigid body having a plate-like holding portion 71 that partly or entirely holds the measurement optical system in a shared manner at each of the front and back. The plate-like holding portion 71 has through holes 71*h* that allow light beams propagating in the measurement optical system to pass therethrough. For example, the plate-like holding portion 71 does not hold the condenser lens 23 but holds the residual optical elements from among the measurement optical system.

As shown in FIG. 2, the optical-system holder 70 three-dimensionally holds the measurement optical system to extend over both sides of the plate-like holding portion 71. Accordingly, the plate-like holding portion 71 that holds the measurement optical system can be reduced in size. Even if the small plate-like holding portion 71 employs a relatively thin and light member, a sufficient rigidity can be provided. Thus, the optical-system holder 70 that is small and has a very simple structure can prevent that the phases of the two types of measurement lights P1 and P2 are shifted due to deformation (bending) of the plate-like holding portion 71. For example, the optical-system holder 70 has dimensions of about 150×90×100 mm, and can integrally hold the measurement optical system. It is to be noted that FIG. 2(A) does not illustrate a support member that fixes the measurement optical system with respect to the plate-like holding portion 71.

The plate-like holding portion 71 is a member that is reinforced such that edge portions of the holding portion 71 are fixed to other members. In the example shown in FIG. 2, the plate-like holding portion 71 is a rectangular plate member, and three edge portions are reinforced such that the three edge portions are fixed to three reinforcing plates 72 to 74 that are coupled in a bending form. Also, in the example shown in FIG. 2, the reinforcing plate 74 also has a through hole 74*h* extends toward the workpiece 1. The through hole 74*h* is an optical path of the measurement light P1. Also, the reinforcing plate 74 holds the condenser lens 23. The optical-system holder 70 is, for example, a metal member made of stainless steel, iron, aluminum, etc.

Figure 3:
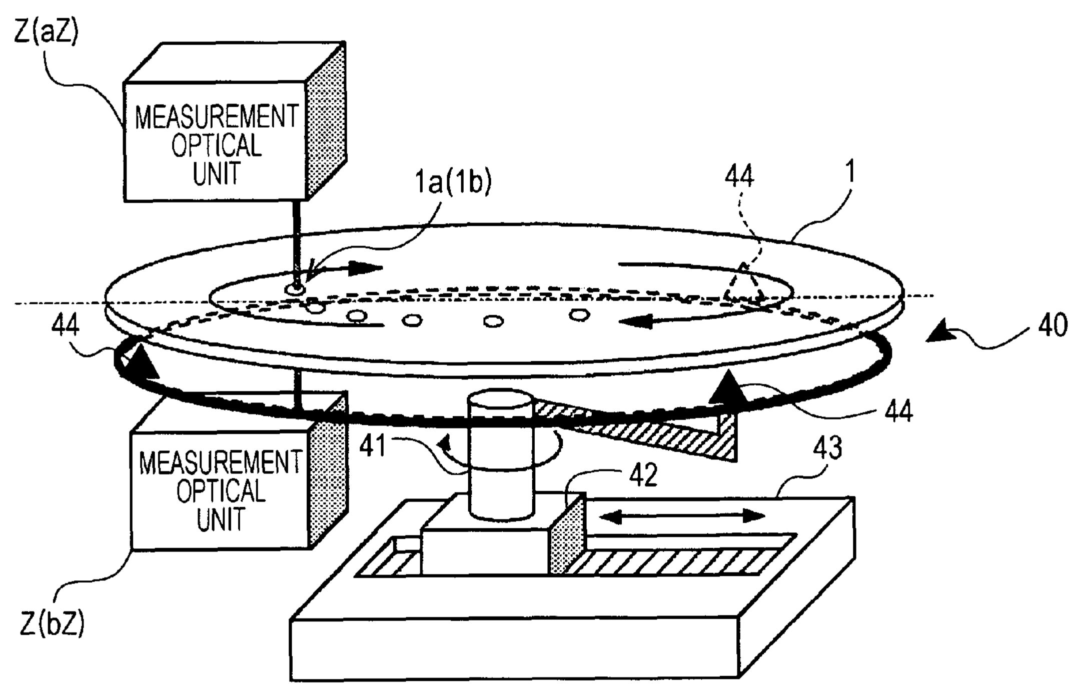
FIG. 3 is a schematic diagram showing an example of a method for measuring a thickness distribution of a workpiece by using the profile measuring apparatus shown in FIG. 1.

Next, a mechanism for scanning a surface of the workpiece 1 by the profile measuring apparatus X will be described with reference to FIG. 3. As shown in FIG. 3, the profile measuring apparatus X includes a movably supporting device 40 that movably supports the workpiece 1. The profile measuring apparatus X can measure the thickness of a specific portion of the workpiece 1 with high accuracy at high speed without being affected by vibration of the workpiece 1. The profile measuring apparatus X includes the movably supporting device 40 that supports the workpiece 1 at a center portion and an end portion of the workpiece 1 and performs scanning with the object light for the workpiece 1 while moving the workpiece 1 in a plane orthogonal to the thickness direction of the workpiece 1 (in a plane parallel to the front and back surfaces of the workpiece 1).

The movably supporting device 40 shown in FIG. 3 supports the disk-like workpiece 1 such as a semiconductor wafer at three points of the edge portion by support portions 44 arranged at three positions on the circumference. The three support portions 44 are coupled to a rotation shaft 41 that extends toward the center of the circumference. Further, the support shaft 41 is rotationally driven by a rotational drive 42 such as a servomotor. Accordingly, the workpiece 1 is rotated such that the center portion of the workpiece 1 serves as the rotation center. Also, a linearly moving mechanism 43 linearly moves the support shaft 41 and the rotational drive 42 in the direction parallel to the front and back surfaces of the workpiece 1 (in the direction orthogonal to the thickness direction) within a predetermined moving range. That is, the linearly moving mechanism 43 moves the workpiece 1 along a radial direction of the workpiece 1. Also, the movably supporting device 40 including the support shaft 41, the rotational drive 42, and the linearly moving mechanism 43 supports the workpiece 1 between the irradiation position of the measurement light P1 by the heterodyne interferometer 20 at the A surface and the irradiation position of the measurement light P1 by the heterodyne interferometer 20 at the B surface.

By using the rotation of the workpiece 1 by the rotational drive 42 and the movement of the workpiece 1 in a linear direction by the linearly moving mechanism 43, the thickness measurement by the profile measuring apparatus X is executed while the positions of the measurement portions 1*a* and 1*b* at the workpiece 1 are successively changed. For example, the computer 6 acquires data of the phase differences $\Delta\Phi\mathbf{1}$ and $\Delta\Phi\mathbf{2}$ at the A surface and B surface from the phase detectors 4 while the workpiece 1 is continuously rotated and linearly moved at a constant speed, at a constant interval, or every time when the position of the measurement points 1*a* and 1*b* becomes a predetermined position. Further, the computer 6 substitutes the two phase differences ΔΦ1 and ΔΦ2 into Expression F1, and hence calculates the thickness Ds of the workpiece 1.

Figure 4:
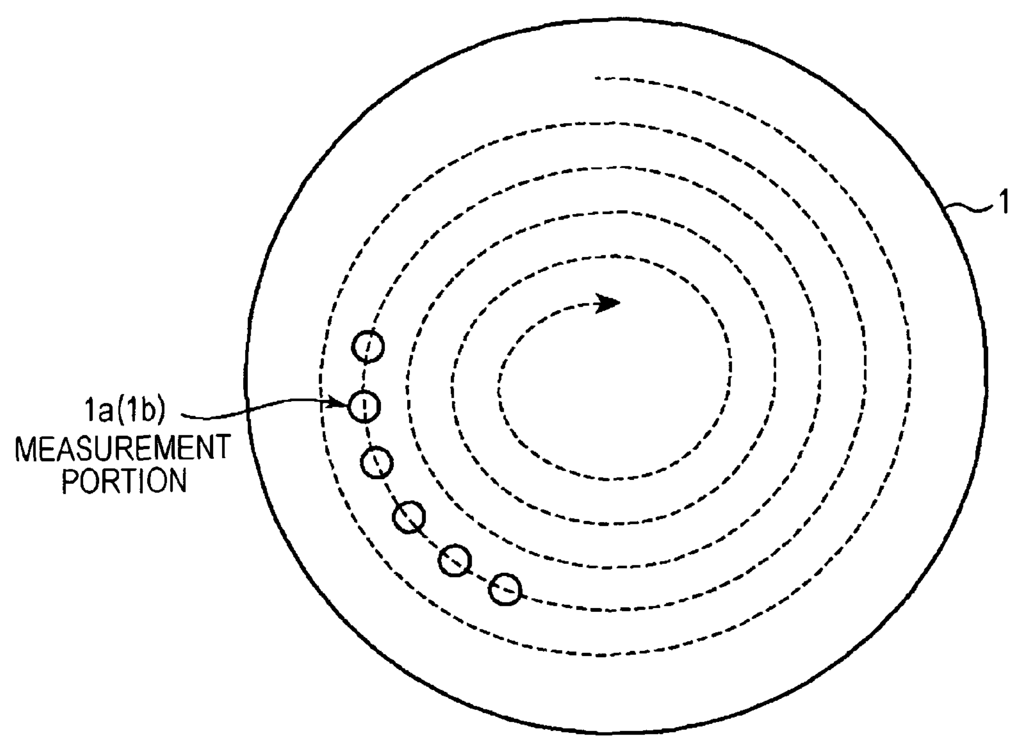
FIG. 4 is a schematic diagram showing an example of a locus of a measurement portion when the thickness distribution of the workpiece is measured by using the profile measuring apparatus shown in FIG. 1.

FIG. 4 is a schematic illustration showing an example of distribution of the measurement portions 1*a* and 1*b* on the workpiece 1. When the phase detection of the interfering light is successively performed while the workpiece 1 is rotated and linearly moved, as shown in FIG. 4, the position of the measurement portions 1*a* and 1*b* is successively changed along a spiral line (a wavy line) on the surfaces of the workpiece 1. Then, the thickness measurement is successively performed while the movably supporting device 40 two-dimensionally moves the holding position of the workpiece 1, and the measurement data is stored in a predetermined storage portion. Accordingly, thickness distribution data of the workpiece 1 can be obtained. If the thickness of the disk-like workpiece 1 is small, when the workpiece 1 is partly supported as shown in FIG. 3, the workpiece 1 vibrates in the thickness direction by vibration due to a slight wind pressure or vibration of the floor. However, even if the workpiece 1 vibrates, the profile measuring apparatus X can measure the thickness distribution of the workpiece 1 with high accuracy without being affected by the vibration. The mechanism for positioning the workpiece 1 in a plane parallel to the surfaces of the workpiece 1 may not be the mechanism shown in FIG. 3, and may be a mechanism that moves the support portion of the workpiece 1 along two lines intersecting with each other, such as an X-Y plotter.

Figure 5:
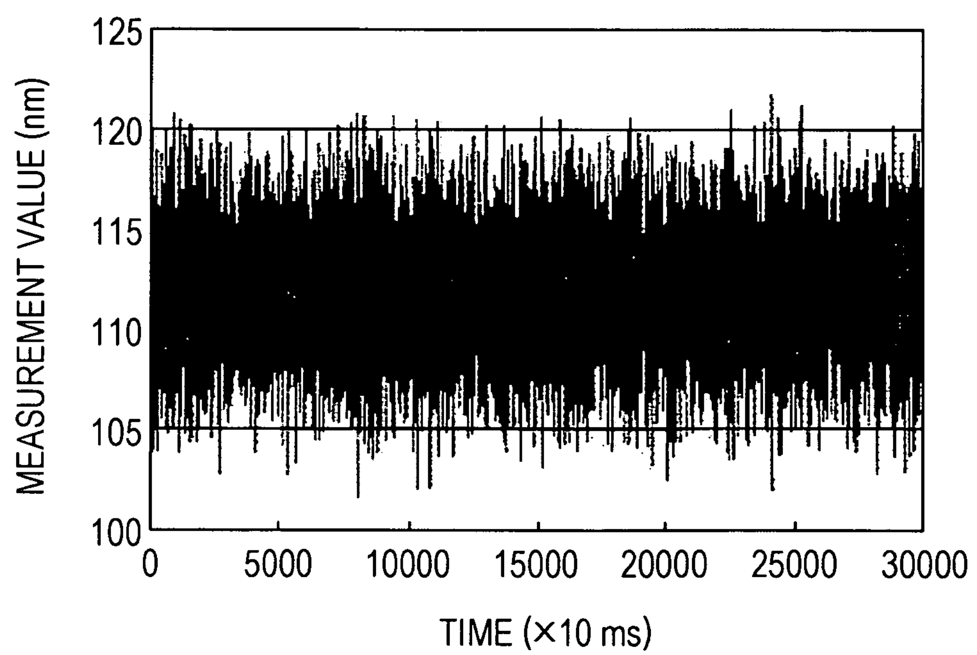
FIG. 5 is a graph showing an example of a change in time series of a measurement value of a conventional profile measuring apparatus.
Figure 6:
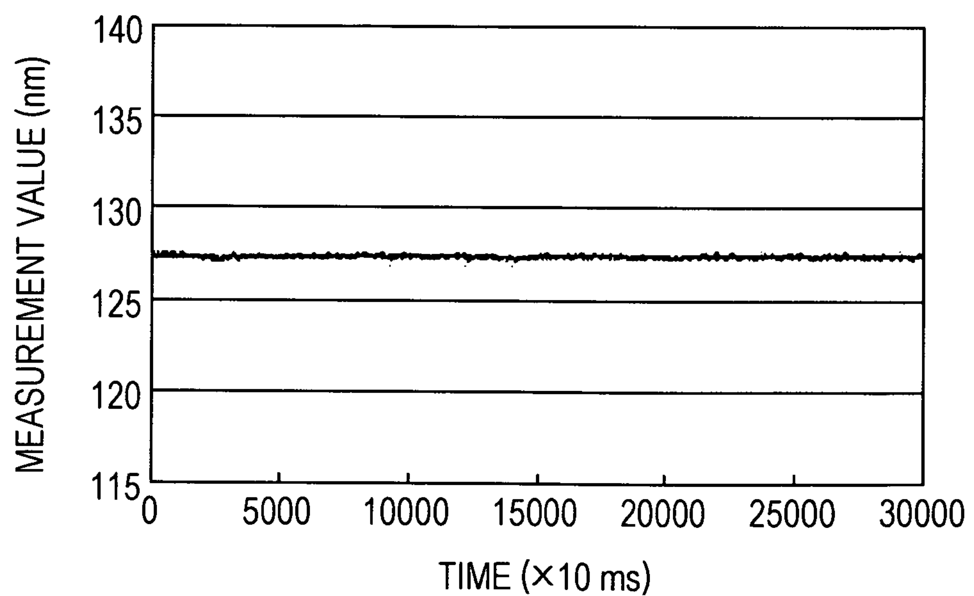
FIG. 6 is a graph showing an example of a change in time series of a measurement value of the profile measuring apparatus shown in FIG. 1.

FIG. 5 is a graph showing an example of a change in time series of a measurement value of a conventional profile measuring apparatus. FIG. 6 is a graph showing an example of a change in time series of a measurement value of the above-described profile measuring apparatus X. Here, the conventional profile measuring apparatus performs thickness measurement of the workpiece 1 by transmitting the two measurement lights P1 and P2 with slightly different frequencies from the position of the light source to the positions of the reference interferometer 30 and the heterodyne interferometer 20 at each of the A surface and B surface by using optical fibers. In the conventional profile measuring apparatus and the above-described profile measuring apparatus X, the optical fibers that transmit the two measurement lights P1 and P2 or the branched lights of the source light P0 from the position of the light source to both surfaces of the workpiece 1 are not treated for vibration control.

As shown in FIG. 5, the conventional profile measuring apparatus provides a thickness measurement value that largely varies due to a noise such as vibration of the transmission paths of the two measurement lights P1 and P2. In contrast, the above-described profile measuring apparatus X provides a stable thickness measurement value although a countermeasure for signal control is not particularly provided for the optical fiber a10 or b10. Accordingly, with the above-described profile measuring apparatus X, the thickness of the workpiece 1 can be easily measured with high accuracy without being affected by the vibration of the workpiece 1 or the vibration of the transmission medium for the branched lights of the source light P0 from the single-wavelength laser light source 2 to the measurement optical unit Z.

Next, another embodiment will be described.

Second Embodiment

The profile measuring apparatus X according to the first embodiment measures the thickness of the workpiece 1 with high accuracy. A profile measuring apparatus S according to a second embodiment measures a thickness and a surface profile of a workpiece 1 with high accuracy. First, the necessity of high-accuracy measurement for the surface profile will be described.

In recent years, the density of elements in an integrated circuit has been increased. A process rule that is a process condition for manufacturing such integrated circuits on a semiconductor wafer is generally determined by a minimum processing dimension of a line width or a gap of gate wiring. If the process rule is halved, the numbers of transistors and wires for wiring theoretically quadruple in the same area, and hence if the number of transistors is not changed, the occupied area becomes one-fourth. Consequently, the number of dies that can be manufactured from a single semiconductor wafer quadruples, and also yield is enhanced. Dies can be manufactured by a further large number. The minimum processing dimension has reached 45 nm in the front line in 2007 for manufacturing integrated circuits with high density.

With the process rule on the order of sub-micrometers (1 μm or smaller), a semiconductor wafer has to have a high flatness, and the surface profile of the semiconductor wafer (a change in height of a surface) is not ignorable. Owing to this, profile measuring apparatuses that measure surface profiles of semiconductor wafer s with high accuracy, for example, on the order of sub-nanometers (1 nm or smaller) have been desired. There has been known an apparatus that measures a surface profile of a workpiece by optical heterodyne interferometry, as one of such profile measuring apparatuses. The optical heterodyne interferometry causes two laser lights with different frequencies to interfere with each other, generates a beat signal having a difference frequency of these laser lights, and detects a phase change of the generated beat signal. The phase change of the beat signal corresponds to a difference between optical-path lengths of the two laser lights. The profile measuring apparatus using the optical heterodyne interferometry is disclosed in, for example, aforementioned PTL 2.

The profile measuring apparatus described in PTL 2 can theoretically measure the surface profile of a surface; however, the measurement result is surface profile data containing the vibration of the semiconductor wafer. The surface profile of the accurate surface cannot be measured on the order of nanometers.

In particular, since an edge portion of a semiconductor wafer has a profile called edge roll-off, the flatness of the surface profile (thickness distribution and surface profile) at the edge portion is generally lower than that at a center portion. To expand the region, where dies can be manufactured, toward the outer edge portion of the semiconductor wafer, it is important to evaluate the edge roll-off. To evaluate the edge roll-off, the surface profile of the semiconductor wafer is desirably measured with further high accuracy.

The profile measuring apparatus S according to the second embodiment is an apparatus which has been developed under such circumstances, and is an apparatus that can measure a surface profile of a workpiece (measurement object) with further high accuracy.

The profile measuring apparatus X according to the first embodiment includes a light source unit that generates a measurement light; an optical branching device that branches the measurement light generated by the light source unit into a one-surface measurement light and a other-surface measurement light; a one-surface measurement unit that further branches the one-surface measurement light, which is branched by the optical branching device, into a first one-surface measurement light and a second one-surface measurement light, that generates a post-irradiation one-surface interfering light, which is obtained by optical heterodyne interference by causing a post-irradiation one-surface measurement light, which is included in the branched first one-surface measurement light and is irradiated on and reflected by one surface of a measurement object, to interfere with the branched second one-surface measurement light, and that generates a pre-irradiation one-surface interfering light, which is obtained by optical heterodyne interference by causing a pre-irradiation one-surface measurement light, which is included in the branched first one-surface measurement light and is before being irradiated on the one surface of the measurement object, to interfere with the branched second one-surface measurement light; a other-surface measurement unit that further branches the other-surface measurement light, which is branched by the optical branching device, into a first other-surface measurement light and a second other-surface measurement light, that generates a post-irradiation other-surface interfering light, which is obtained by optical heterodyne interference by causing a post-irradiation other-surface measurement light, which is included in the branched first other-surface measurement light and is irradiated on and reflected by the other surface of the measurement object, to interfere with the branched second other-surface measurement light, and that generates a pre-irradiation other-surface interfering light, which is obtained by optical heterodyne interference by causing a pre-irradiation other-surface measurement light, which is included in the branched first other-surface measurement light and is before being irradiated on the other surface of the measurement object, to interfere with the branched second other-surface measurement light; an arithmetic unit that obtains a thickness of the measurement object based on a phase difference between a one-surface phase, which is obtained by detecting phases of the pre-irradiation one-surface interfering light and the post-irradiation one-surface interfering light generated by the one-surface measurement unit, and a other-surface phase, which is obtained by detecting phases of the pre-irradiation other-surface interfering light and the post-irradiation other-surface interfering light generated by the other-surface measurement unit; a one-surface optical guiding unit that guides the one-surface measurement light to the one-surface measurement unit; and a other-surface optical guiding unit that guides the other-surface measurement light to the other-surface measurement unit. To perform the optical heterodyne interference, the one-surface measurement unit includes a one-surface optical modulator that modulates frequencies of the first and second one-surface measurement lights. To perform the optical heterodyne interference, the other-surface measurement unit includes a other-surface optical modulator that modulates frequencies of the first and second other-surface measurement lights. A measurement optical system of the one-surface measurement unit is integrally held. A measurement optical system of the other-surface measurement unit is integrally held.

The profile measuring apparatus S according to the second embodiment includes a light source unit that generates a measurement light; an optical branching device that branches the measurement light generated by the light source unit into a one-surface measurement light and a other-surface measurement light; a one-surface measurement unit that further branches the one-surface measurement light, which is branched by the optical branching device, into a first one-surface measurement light and a second one-surface measurement light, that generates a post-irradiation one-surface interfering light, which is obtained by optical heterodyne interference by causing a post-irradiation one-surface measurement light, which is included in the branched first one-surface measurement light and is irradiated on and reflected by one surface of a measurement object, to interfere with the branched second one-surface measurement light, and that generates a pre-irradiation one-surface interfering light, which is obtained by optical heterodyne interference by causing a pre-irradiation one-surface measurement light, which is included in the branched first one-surface measurement light and is before being irradiated on the one surface of the measurement object, to interfere with the branched second one-surface measurement light; a other-surface measurement unit that further branches the other-surface measurement light, which is branched by the optical branching device, into a first other-surface measurement light and a second other-surface measurement light, that generates a post-irradiation other-surface interfering light, which is obtained by optical heterodyne interference by causing a post-irradiation other-surface measurement light, which is included in the branched first other-surface measurement light and is irradiated on and reflected by the other surface of the measurement object, to interfere with the branched second other-surface measurement light, and that generates a pre-irradiation other-surface interfering light, which is obtained by optical heterodyne interference by causing a pre-irradiation other-surface measurement light, which is included in the branched first other-surface measurement light and is before being irradiated on the other surface of the measurement object, to interfere with the branched second other-surface measurement light; and an arithmetic unit that obtains a thickness of the measurement object based on a phase difference between a one-surface phase, which is obtained by detecting phases of the pre-irradiation one-surface interfering light and the post-irradiation one-surface interfering light generated by the one-surface measurement unit, and a other-surface phase, which is obtained by detecting phases of the pre-irradiation other-surface interfering light and the post-irradiation other-surface interfering light generated by the other-surface measurement unit. To generate a plurality of the post-irradiation one-surface interfering lights, the one-surface measurement unit obtains a plurality of the post-irradiation one-surface measurement lights by causing the first one-surface measurement light to be irradiated at a plurality of positions on the one surface of the measurement object and to be reflected. The arithmetic unit obtains a surface profile of the measurement object at each of the plurality of positions by obtaining a distance from a predetermined reference plane to the one surface of the measurement object based on a one-surface phase, which is obtained by detecting phases of the pre-irradiation one-surface interfering light and the post-irradiation one-surface interfering light generated by the one-surface measurement unit, at each of the plurality of positions.

The profile measuring apparatus S according to the second embodiment is specifically an apparatus as described below.

Figure 7:
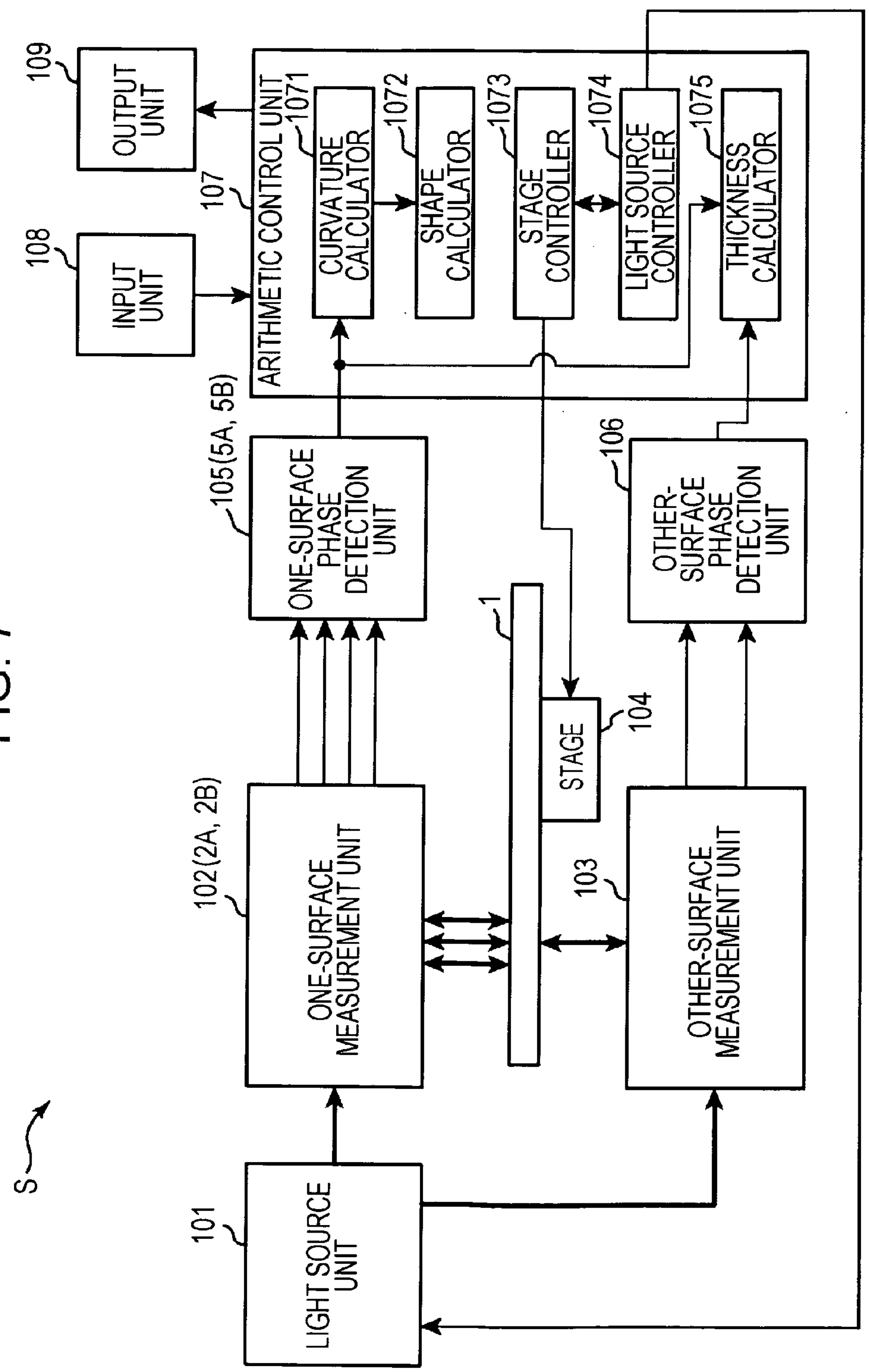
FIG. 7 is a block diagram showing a configuration of a profile measuring apparatus according to a second embodiment.

FIG. 7 is a block diagram showing a configuration of the profile measuring apparatus according to the second embodiment. The profile measuring apparatus S according to the second embodiment is an apparatus that measures a surface profile of a thin-plate-like workpiece (measurement object) 1 such as a semiconductor wafer on the order of nanometers or sub-nanometers (resolution with 1 nm or smaller in the thickness direction) by using optical heterodyne interferometry. For example, as shown in FIG. 7, the profile measuring apparatus S includes a light source unit 101, a one-surface measurement unit 102 (102A, 102B), a other-surface measurement unit 103, a stage 104, a one-surface phase detection unit 105 (105A, 105B), a other-surface phase detection unit 106, an arithmetic control unit 107, an input unit 8, and an output unit 9. The profile measuring apparatus S measures the surface profile of the workpiece 1 while moving the workpiece 1 in the horizontal direction by the stage 104.

Although respective portions of the profile measuring apparatus S will be described below, optical parts (optical elements) which are frequently used in the respective portions are collectively described now.

An optical branching device (non-polarization beam splitter) is an optical part that distributes an incident light into two lights in terms of optical power, and emits the lights. The optical branching device may use, for example, a micro-optical-element-form optical splitter and coupler, such as a half mirror (semi-transparent mirror); an optical-fiber-form optical splitter and coupler of fused fibers; or an optical-waveguide-form optical splitter and coupler. When an input terminal and an output terminal of the optical branching device are switched (reversed) and used, the optical branching device generally functions as an optical coupling unit that couples two incident lights and emits the coupled light. When a half mirror is used as the optical branching device, one distributed light generally passes through the half mirror and is emitted in the same direction, and the other distributed light is reflected by the half mirror and is emitted in a direction perpendicular to (direction orthogonal to) that direction.

A polarization beam splitter is an optical part that extracts an S-polarized light and a P-polarized light, which are orthogonal to each other, from an incident light. In general, one extracted light (S-polarized light or P-polarized light) is emitted in the same direction, and the other extracted light (P-polarized light or S-polarized light) is emitted in a direction perpendicular to (direction orthogonal to) that direction.

A polarizer is an optical part that extracts a linear polarized light having a predetermined polarization plane from an incident light and emits the extracted light. For example, the polarizer is a polarizing filter.

A wave plate (phase plate) is an optical part that emits a light while giving a predetermined phase difference (i.e., optical-path difference) between two polarization components of an incident light. For example, the wave plate is a ¼ wave plate or a ½ wave plate that gives an optical-path difference of $\lambda/2$ between two polarization components of an incident light. When d is a thickness of a crystal plate such as a birefringent white mica plate that forms the wave plate, n1 and n2 are refractive indices of the crystal plate for two polarization components, and $\lambda$ is a wavelength of an incident light, this wave plate gives a phase difference of $(2\pi/2)(n1-n2)d$.

A reflection mirror (mirror) is an optical part that changes a light traveling direction by reflecting an incident light with a predetermined reflectivity at a reflection angle corresponding to an incidence angle. For example, the reflection mirror is formed by evaporatively depositing a metal thin film or a dielectric multilayer film on a surface of a glass member. The reflection mirror is preferably a total reflection mirror that totally reflects a light to reduce loss of the light.

An input terminal is a terminal for allowing a light to be incident on an optical part. Also, an output terminal is a terminal for allowing a light to be emitted from an optical part. Light guiding means formed of an optical part, such as a mirror or a lens, may be used for connection between respective parts. In this embodiment, though described later, optical fibers, such as polarization maintaining optical fibers or multi-mode optical fibers, are used for the connection between the respective parts. Hence, the input terminal and the output terminal use connectors for connecting the optical fibers.

Figure 8:
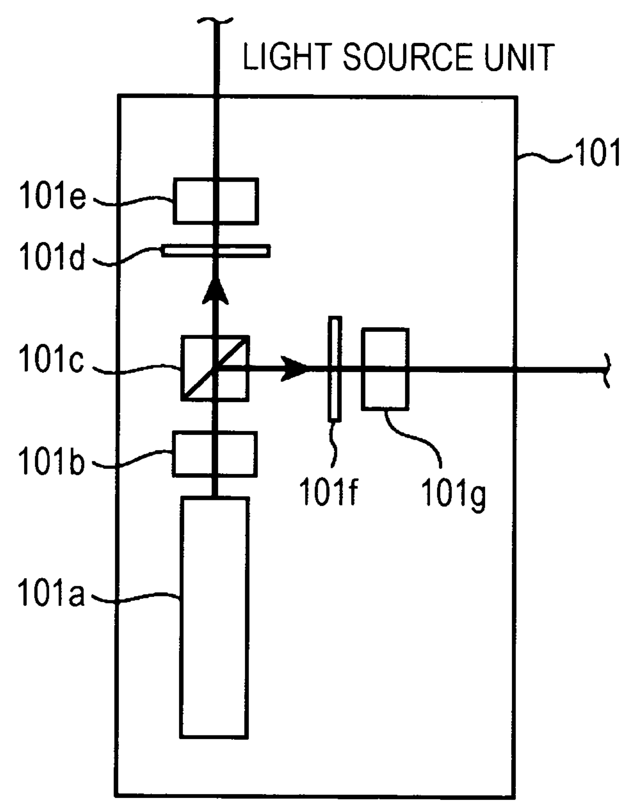
FIG. 8 is an illustration showing a configuration of a light source unit in the profile measuring apparatus shown in FIG. 7.

The respective portions of the profile measuring apparatus S will be described below. The light source unit 101 is described first. FIG. 8 is an illustration showing a configuration of the light source unit in the profile measuring apparatus according to the second embodiment. The light source unit 101 is a device that generates a measurement light, which is a predetermined coherent light, for measuring the surface profile of the workpiece 1 by optical heterodyne interferometry. The measurement light is a single-wavelength light with a predetermined wavelength $\lambda$ (frequency $\omega$), and is a polarized light having a predetermined polarization plane. The measurement light includes two one-surface measurement light (A measurement light) and other-surface measurement light (B measurement light) for measuring the measurement object from both surfaces thereof by optical heterodyne interferometry. For example, as shown in FIG. 8, this light source unit 101 includes a single-wavelength laser light source 101*a*, an optical isolator 101*b*, an optical branching device 101*c*, polarizer 101*d* and 101*f*, and output terminals 101*e* and 101*g*.

The single-wavelength laser light source 101*a* is a device that generates a single-wavelength laser light with a predetermined wavelength λ0 (frequency ω0), and may use any of various types of laser devices. For example, a helium-neon laser device (He—Ne laser device) that can output a laser light with a wavelength of about 632.8 nm by a predetermined optical power is used. The single-wavelength laser light source 101*a* is preferably a frequency stabilizing laser device including, for example, a wavelength locker. The optical isolator 101*b* is an optical part that transmits a light only in a single direction from the input terminal to the output terminal. The optical isolator 101*b* prevents a reflected light (returned light) generated at a connection portion or the like of the respective optical parts (optical elements) in the profile measuring apparatus S from being incident on the single-wavelength laser light source 101*a*, in order to stabilize laser oscillation of the single-wavelength laser light source 101*a*.

In such a light source unit 101, the laser light emitted from the single-wavelength laser light source 101*a* is incident on the optical branching device 101*c* through the optical isolator 101*b*, and is distributed into two first and second laser lights. The first laser light is incident on the polarizer 101*d*, becomes a one-surface measurement light of the laser light with a predetermined polarization plane, and is emitted from the output terminal 101*e*. The one-surface measurement light is incident on the one-surface measurement unit 102. In contrast, the second laser light is incident on the polarizer 101*f*, becomes a other-surface measurement light of the laser light with a predetermined polarization plane, and is emitted from the output terminal 101*g*. The other-surface measurement light is incident on the other-surface measurement unit 103.

For convenience of the description, one surface (in an example shown in FIG. 7, an upper-side surface (upper surface)) of the workpiece 1 is named "A surface," and the other surface (in the example shown in FIG. 7, a lower-side surface (lower surface)) is named "B surface." Both surfaces (the A and B surfaces) have the front-and-back relationship. In this embodiment, the one-surface measurement light is used for measuring a surface profile of the A surface of the workpiece 1 by optical heterodyne interferometry, and the other-surface measurement light is used for measuring a surface profile of the B surface of the workpiece 1 by optical heterodyne interferometry.

For connection between the light source unit 101 and the one-surface measurement unit 102, and for connection between the light source unit 101 and the other-surface measurement unit 103, polarization maintaining optical fibers that guides lights while maintaining polarization planes of the lights are used in this embodiment, to easily adjust an optical-path length between the light source unit 101 and the one-surface measurement unit 102 and an optical-path length between the light source unit 101 and the other-surface measurement unit 103. The polarization maintaining optical fiber is, for example, a PANDA fiber or an elliptic core optical fiber. The one-surface measurement light emitted from the output terminal 101*e* of the light source unit 101 is guided by the polarization maintaining optical fiber, and is incident on the one-surface measurement unit 102. The other-surface measurement light emitted from the output terminal 101*g* of the light source unit 101 is guided by the polarization maintaining optical fiber and is incident on the other-surface measurement unit 103.

Figure 9:
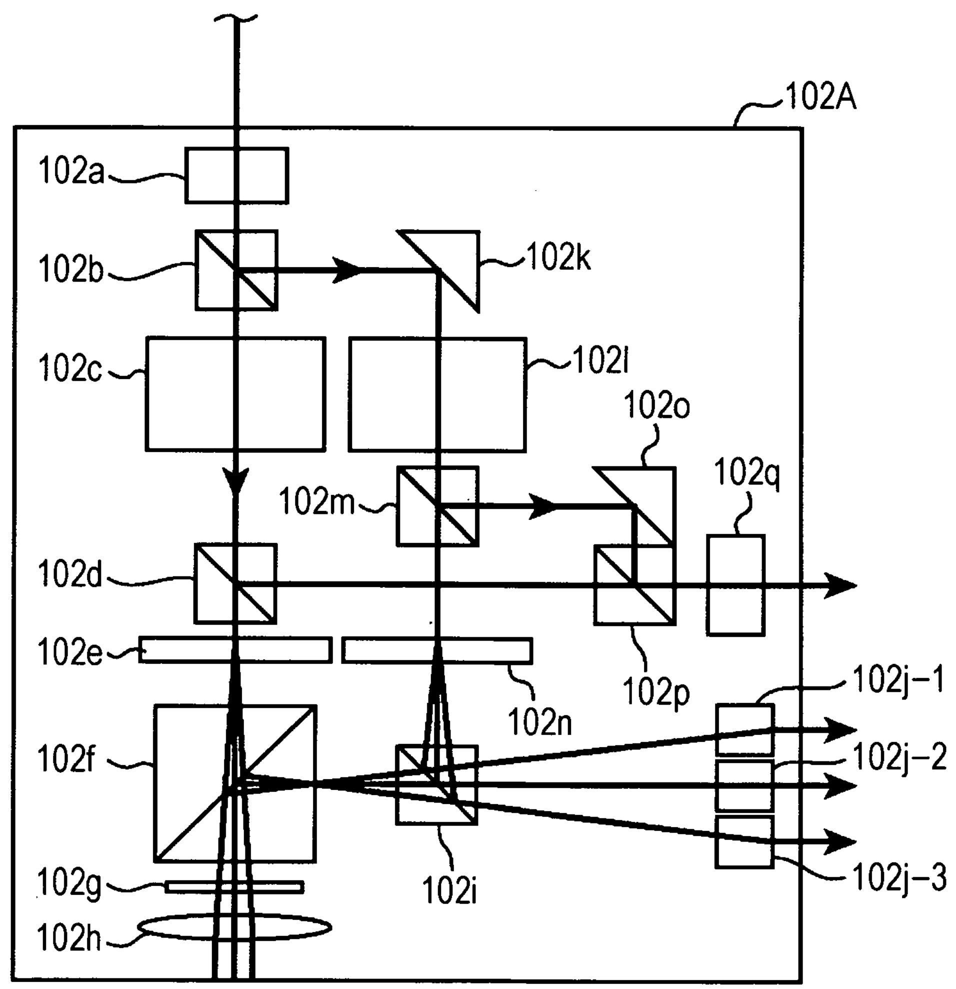
FIG. 9 is an illustration showing a configuration of a one-surface measurement unit according to a first aspect in the profile measuring apparatus shown in FIG. 7.
Figure 10:
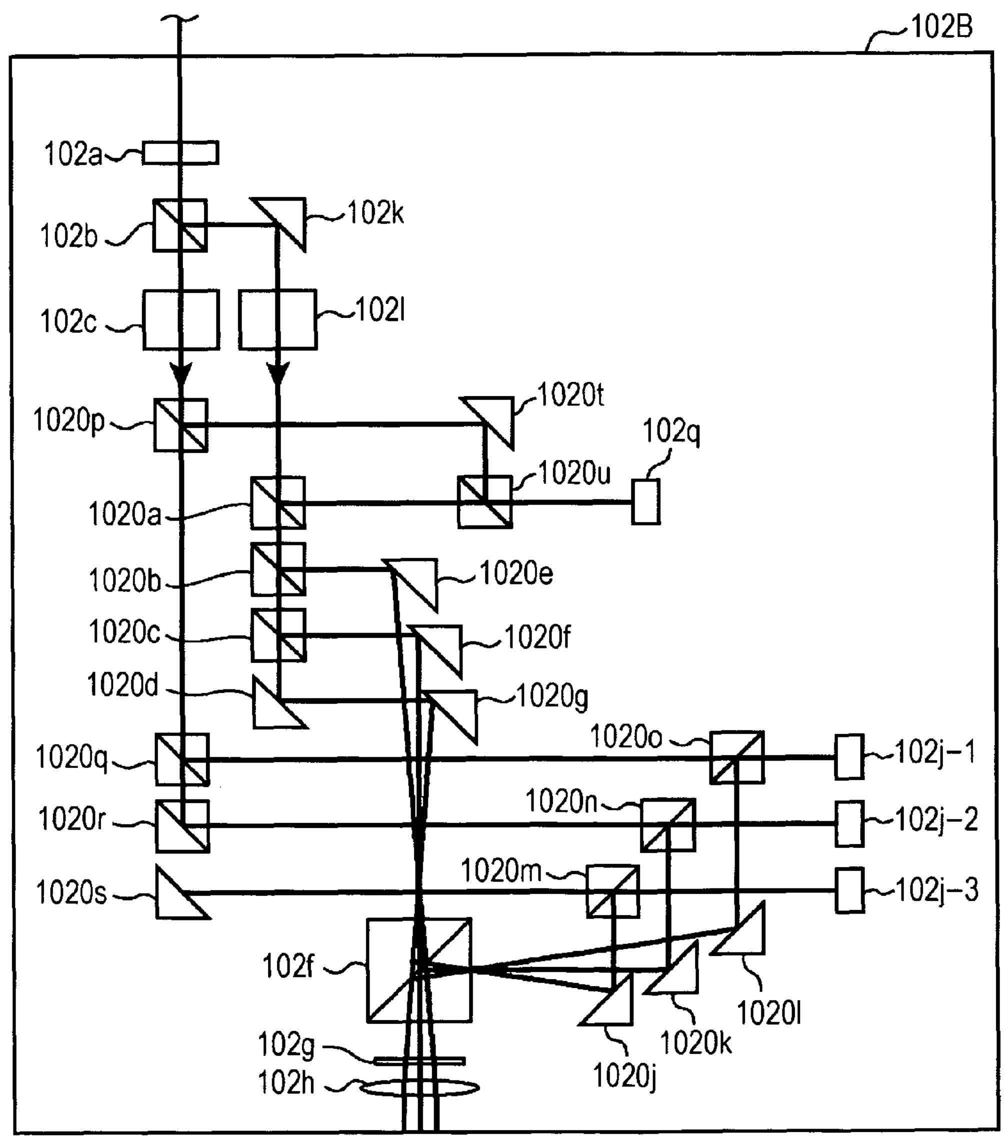
FIG. 10 is an illustration showing a configuration of a one-surface measurement unit according to a second aspect in the profile measuring apparatus shown in FIG. 7.

Next, the one-surface measurement unit 102 is described. FIG. 9 is an illustration showing a configuration of a one-surface measurement unit according to a first aspect in the profile measuring apparatus according to the second embodiment. FIG. 10 is an illustration showing a configuration of a one-surface measurement unit according to a second aspect in the profile measuring apparatus according to the second embodiment.

The one-surface measurement unit (A measurement unit) 102 is a device that receives the one-surface measurement light from the light source unit 101 and acquires a beat optical signal, which contains surface profile information of the A surface of the workpiece 1, by optical heterodyne interferometry using the one-surface measurement light.

To be more specific, the one-surface measurement unit 102 is a measurement optical system that is arranged to face an A surface of the workpiece 1, that further branches the one-surface measurement light from the light source unit 101 into a first one-surface measurement light (A1 measurement light) and a second one-surface measurement light (A2 measurement light), that generates a post-irradiation one-surface interfering light (A post-irradiation interfering light), which is obtained by optical heterodyne interference by causing a post-irradiation one-surface measurement light, which is included in the branched first one-surface measurement light and is irradiated on and reflected by the A surface of the workpiece 1, to interfere with the branched second one-surface measurement light, and that generates a pre-irradiation one-surface interfering light (A pre-irradiation interfering light), which is obtained by optical heterodyne interference by causing a pre-irradiation one-surface measurement light (A pre-irradiation measurement light), which is included in the branched first one-surface measurement light and is before being irradiated on the A surface of the workpiece 1, to interfere with the branched second one-surface measurement light. To generate a plurality of the post-irradiation one-surface interfering lights for measuring a surface profile of the A surface of the workpiece 1, the one-surface measurement unit 102 is also a measurement optical system that obtains a plurality of the post-irradiation one-surface measurement lights by causing the first one-surface measurement light to be irradiated at a plurality of positions P in a single measurement portion MP on the A surface of the workpiece 1 and to be reflected. With the one-surface measurement unit 102 thus configured, phases of the plurality of post-irradiation one-surface interfering lights can be measured with reference to the pre-irradiation one-surface interfering light.

To be further specific, the one-surface measurement unit 102 is an optical heterodyne interferometer that is arranged to face the A surface of the workpiece 1, that generates two first and second one-surface measurement lights with mutually different frequencies from the one-surface measurement light, that causes the two first and second one-surface measurement lights to interfere with each other (optical heterodyne interference), and that generates a beat optical signal having a frequency which is the difference between frequencies of the first and second one-surface measurement lights. The one-surface measurement unit 102 is also a measurement optical system including a first one-surface optical path and a second one-surface optical path. In the first one-surface optical path, the first one-surface measurement light is irradiated on and reflected by the A surface of the workpiece 1, and in the second one-surface optical path, the first one-surface measurement light is not irradiated on the A surface, in a period from when the first and second one-surface measurement lights are generated from the one-surface measurement light to when the first and second one-surface measurement lights interfere with each other. Further, to measure the surface profile of the A surface of the workpiece 1, the first one-surface measurement light is further distributed into plural lights before the first one-surface measurement light is irradiated on the A surface of the workpiece 1, the distributed lights are irradiated on and reflected by the A surface of the workpiece 1, the second one-surface measurement light is further distributed into plural lights before the first and second one-surface measurement lights interfere with each other, correspondingly to the distribution of the first one-surface measurement light into the plural lights, and the distributed lights interfere with the plurality of first one-surface measurement lights reflected by the A surface of the workpiece 1.

As such a one-surface measurement unit 102, a one-surface measurement unit 102A according to a first aspect with the configuration shown in FIG. 9, or a one-surface measurement unit 102B according to a second aspect with the configuration shown in FIG. 10 may be exemplified.

As shown in FIG. 9, the one-surface measurement unit 102A according to the first aspect includes an input terminal 102*a*, optical branching devices 102*b*, 102*d*, 102*i*, 102*m*, and 102*p*, a polarization beam splitter 102*f*, optical wavelength shifters 102*c* and 102*l*, reflection mirrors 102*k* and 102*o*, diffraction gratings 102*e* and 102*n*, a ¼ wave plate 102*g*, a lens 102*h*, and output terminals 102*j* (102*j*-1 to 102*j*-3) and 102*q*.

The optical wavelength shifters 102*c* and 102*l* are optical parts that shift wavelengths of incident lights (change frequencies of incident lights) and generate lights with wavelengths (frequencies) that are different from wavelengths (frequencies) of the incident lights. For example, an acoustooptic modulator that shifts a wavelength of an incident light by using acoustooptic effect may be used. The diffraction gratings 102*e* and 102*n* are optical parts that diffract incident lights. In this embodiment, the diffraction gratings 102*e* and 102*n* are transmissive diffraction gratings that, when the incident lights are incident on the gratings, transmit the incident lights and emit diffracted lights. The lens 102*h* is an objective lens of the one-surface measurement unit 102A for the workpiece 1, and is an aspheric condenser lens.

With the one-surface measurement unit 102A thus configured, the one-surface measurement light incident on the input terminal 102*a* from the light source unit 101 through the polarization maintaining optical fiber is incident on the optical branching device 102*b*, and is distributed into two first and second one-surface measurement lights. The first one-surface measurement light travels in the same direction (a traveling direction of an incident light is the same as a traveling direction of an emitted light at the optical branching device 102*b*) and the second one-surface measurement light travels in a direction orthogonal to (perpendicular to) the traveling direction of the first one-surface measurement light. The first one-surface measurement light is incident on the optical wavelength shifter 102c, and then the wavelength (frequency) is shifted (changed). The second one-surface measurement light is incident on the optical wavelength shifter 102l through the reflection mirror 102k, and then the wavelength (frequency) is shifted (changed). A frequency difference ΔωA between a frequency ωA1 of the first one-surface measurement light and a frequency ωA2 of the second one-surface measurement light after the frequency change (after the wavelength shift) is not particularly limited. However, for the interference by optical heterodyne, for example, the frequency difference ΔωA is a value in a range from about several tens of kilohertz to several megahertz. In this point, the one-surface measurement unit 102B according to the second aspect and the other-surface measurement unit 103, which will be described later, are similar to the one-surface measurement unit 102A.

In this embodiment, the wavelengths of the first and second one-surface measurement lights are respectively shifted by the wavelength shifters 102c and 102cl; however, there is only required the predetermined frequency difference ΔωA between the frequency ωA1 of the first one-surface measurement light ωA1 and the frequency ωA2 of the second one-surface measurement light for the interference by optical heterodyne. Hence, only a single wavelength shifter may be provided. In this point, the one-surface measurement unit 102B according to the second aspect and the other-surface measurement unit 103, which will be described later, are similar to the one-surface measurement unit 102A.

Also, the second one-surface measurement light emitted from the optical branching device 102b travels in the direction orthogonal to the traveling direction of the first one-surface measurement light by the optical branching device 102b in this embodiment. The traveling direction of the second one-surface measurement light is bent at a right angle by the reflection mirror 102k, and is aligned with the traveling direction of the first one-surface measurement light. The reflection mirror 102k is provided to align the traveling direction of the first one-surface measurement light emitted from the optical branching device 102b with the traveling direction of the second one-surface measurement light.

The first one-surface measurement light emitted from the wavelength shifter 102c (the first one-surface measurement light after the wavelength shift) is incident on the optical branching device 102d, and is distributed into two eleventh one-surface measurement light (A11 measurement light) and twelfth one-surface measurement light (A12 measurement light). The eleventh one-surface measurement light travels in the same direction, whereas the twelfth one-surface measurement light travels in a direction orthogonal to the traveling direction of the eleventh one-surface measurement light. Also, the second one-surface measurement light emitted from the wavelength shifter 102l (the second one-surface measurement light after the wavelength shift) is incident on the optical branching device 102m, and is distributed into two twenty-first one-surface measurement light (A21 measurement light) and twenty-second one-surface measurement light (A22 measurement light). The twenty-first one-surface measurement light travels in the same direction, whereas the twenty-second one-surface measurement light travels in a direction orthogonal to the traveling direction of the twenty-first one-surface measurement light.

The twelfth one-surface measurement light is a pre-irradiation one-surface measurement light, and is incident on the optical branching device 102p. The twenty-second one-surface measurement light is incident on the optical branching device 102p through the reflection mirror 102o. The twelfth one-surface measurement light and the twenty-second one-surface measurement light incident on the optical branching device 102p are coupled by the optical branching device 102p, and thus optical heterodyne interference is performed. A resultant beat optical signal is emitted as a pre-irradiation one-surface interfering light from the output terminal 102q. Here, the optical branching device 102p functions as an optical coupling unit. The pre-irradiation one-surface interfering light of the beat optical signal emitted from the output terminal 102q is incident on the one-surface phase detection unit 105.

Also, to irradiate a plurality of positions P in a single measurement portion MP on the A surface of the workpiece 1 with a plurality of measurement lights, i.e., the eleventh one-surface measurement light in this embodiment, the eleventh one-surface measurement light is incident on the diffraction grating 102e, is diffracted, and is distributed into plural lights. Correspondingly, the twenty-first one-surface measurement light is incident on the diffraction grating 102n, is diffracted, and is distributed into plural lights. The number of the plurality of positions P may be any number. In this embodiment, since the curvature of the measurement portion is obtained as the surface profile of the workpiece 1, the number is three or more. The number of the plurality of portions P is preferably large, because the accuracy of the obtained curvature is increased. However, the processing amount (arithmetic amount) of information processing (arithmetic processing) is increased, and hence, the number of the plurality of positions P is, for example, three in this embodiment. Accordingly, three diffracted lights from among the diffracted lights diffracted by the diffraction grating 102e are used as the eleventh one-surface measurement lights that are simultaneously irradiated at the three positions on the A surface of the workpiece 1. Correspondingly, three diffracted lights from among the diffracted lights diffracted by the diffraction grating 102n are used as the twenty-first one-surface measurement lights that are coupled by the optical branching device 102l, which will be described later, and is subjected to optical heterodyne interference. The three diffracted lights thus used are relatively strong in optical power and are symmetric. For example, a 0-th order diffracted light, a +1-th order diffracted light, and a −1-th order diffracted light are used.

The plurality of (in this case, three) eleventh one-surface measurement lights diffracted by the diffraction grating 102e are incident on the ¼ wave plate 102g through the polarization beam splitter 102f, are condensed by the lens 102h, and are irradiated at the plurality of positions P in the single measurement portion MP on the A surface of the workpiece 1. The plurality of eleventh one-surface measurement lights respectively reflected by the plurality of positions P on the A surface of the workpiece 1 are incident as the post-irradiation one-surface measurement lights on the lens 102h again, and are incident on the ¼ wave plate 102g. Accordingly, the presence of the ¼ wave plate 102g switches a polarization state (for example, P-polarized light or S-polarized light) of the plurality of eleventh one-surface measurement lights irradiated on the A surface of the workpiece 1 from the polarization beam splitter 102f, and a polarization state (for example, S-polarized light or P-polarized light) of the plurality of eleventh one-surface measurement lights reflected by the A surface of the workpiece 1 and being incident on the polarization beam splitter 102f. Thus, the plurality of eleventh one-surface measurement lights incident on the polarization beam splitter 102f from the diffraction grating 102e pass through the polarization beam splitter 102f toward the A surface of the workpiece 1, and the plurality of eleventh one-surface measurement lights (post-irradiation one-surface measurement lights) incident on the polarization beam splitter 102f through the lens 102h and the ¼ wave plate 102g from the A surface of the workpiece 1 are reflected in a predetermined direction, i.e., in this embodiment, in a direction orthogonal to a direction in which the plurality of eleventh one-surface measurement lights (the post-irradiation one-surface measurement lights) are directed from the A surface of the workpiece 1 toward the polarization beam splitter 102*f*.

The plurality of eleventh one-surface measurement lights (the post-irradiation one-surface measurement lights) emitted from the polarization beam splitter 102*f* are incident on the optical branching device 102*i*. The plurality of twenty-first one-surface measurement lights diffracted and distributed by the diffraction grating 102*n* are also incident on the optical branching device 102*i*. The plurality of eleventh one-surface measurement lights and the plurality of twenty-first one-surface measurement lights incident on the optical branching device 102*i* are coupled by the optical branching device 102*i* and optical heterodyne interference is performed. A plurality of resultant beat optical signals are emitted as a plurality of post-irradiation one-surface interfering lights from the output terminals 102*j* (102*j*-1 to 102*j*-3). Here, the optical branching device 102*i* functions as an optical coupling unit. The plurality of post-irradiation one-surface interfering lights of the beat optical signals emitted from the output terminals 102*j* (102*j*-1 to 102*j*-3) are incident on the one-surface phase detection unit 105.

In this embodiment, the one-surface measurement unit 102A and the one-surface phase detection unit 105 may be connected by single-mode optical fibers. However, since multi-mode optical fibers are advantageous in the optical-axis adjustment and light quantity of propagating light, the one-surface measurement unit 102A and the one-surface phase detection unit 105 are connected by multi-mode optical fibers having a plurality of propagation modes. Hence, in this embodiment, the pre-irradiation one-surface interfering light emitted from the one-surface measurement unit 105A is guided by a multi-mode optical fiber, and is incident on the one-surface phase detection unit 105. The plurality of post-irradiation one-surface interfering lights emitted from the one-surface measurement unit 105A are guided by a plurality of multi-mode optical fibers and are incident on the one-surface phase detection unit 105. Connection between the one-surface measurement unit 102B and the one-surface phase detection unit 105, and connection between the other-surface measurement unit 103 and the other-surface phase detection unit 106, which will be described later, are similar to the above-described connection.

With the one-surface measurement unit 102A thus configured, by using the diffraction grating 102*e*, the single optical element can branch the first one-surface measurement light into the plural lights. Also, by using the diffraction grating 102*n*, the single optical element can branch the second one-surface measurement light into the plural lights. The plurality of positions P can be simultaneously measured by single emission of the one-surface measurement light. Also, the single optical branching device 102*i* can perform the optical heterodyne interference by the plurality of eleventh one-surface measurement lights (the post-irradiation one-surface measurement lights) and the plurality of twenty-first one-surface measurement lights. Therefore, the number of optical parts that form the one-surface measurement unit 102A can be reduced, and the apparatus can be reduced in size and cost.

Also, as shown in FIG. 10, the one-surface measurement unit 102B according to the second aspect includes an input terminal 102*a*, optical branching devices 102*b*, 1020*a*, 1020*b*, 1020*c*, 1020*m*, 1020*n*, 1020*o*, 1020*p*, 1020*q*, 1020*r*, and 1020*u*, a polarization beam splitter 102*f*, optical wavelength shifters 102*c* and 102*l*, reflection mirrors 102*k*, 1020*d*, 1020*e*, 1020*f*, 1020*g*, 1020*j*, 1020*k*, 10201, 1020*s*, and 1020*t*, a ¼ wave plate 102*g*, a lens 102*h*, and output terminals 102*j* (102*j*-1 to 102*j*-3) and 102*q*.

With the one-surface measurement unit 102B thus configured, the one-surface measurement light incident on the input terminal 102*a* from the light source unit 101 through the polarization maintaining optical fiber is incident on the optical branching device 102*b*, and is distributed into two first and second one-surface measurement lights. The second one-surface measurement light travels in the same direction (a traveling direction of an incident light is the same as a traveling direction of an emitted light in the optical branching device 102*b*), and the first one-surface measurement light travels in a direction orthogonal to (direction perpendicular to) the traveling direction of the second one-surface measurement light. The second one-surface measurement light is incident on the optical wavelength shifter 102*c*, and then the wavelength (frequency) is shifted (changed). The first one-surface measurement light is incident on the optical wavelength shifter 102*l* through the reflection mirror 102*k*, and then the wavelength (frequency) is shifted (changed).

Also, the first one-surface measurement light emitted from the optical branching device 102*b* travels in the direction orthogonal to the traveling direction of the second one-surface measurement light by the optical branching device 102*b* in this embodiment. The traveling direction of the first one-surface measurement light is bent at a right angle by the reflection mirror 102*k*, and is aligned with the traveling direction of the second one-surface measurement light. The reflection mirror 102*k* is provided to align the traveling direction of the first one-surface measurement light emitted from the optical branching device 102*b* with the traveling direction of the second one-surface measurement light emitted from the optical branching device 102*b*.

The first one-surface measurement light emitted from the wavelength shifter 102*l* (the first one-surface measurement light after the wavelength shift) is incident on the optical branching device 1020*a*, and is distributed into two eleventh one-surface measurement light and twelfth one-surface measurement light. The eleventh one-surface measurement light travels in the same direction, whereas the twelfth one-surface measurement light travels in a direction orthogonal to the traveling direction of the eleventh one-surface measurement light. The second one-surface measurement light emitted from the wavelength shifter 102*c* (the second one-surface measurement light after the wavelength shift) is incident on the optical branching device 1020*p*, and is distributed into two twenty-first one-surface measurement light and twenty-second one-surface measurement light. The twenty-first one-surface measurement light travels in the same direction, whereas the twenty-second one-surface measurement light travels in a direction orthogonal to the traveling direction of the twenty-first one-surface measurement light.

The twelfth one-surface measurement light is a pre-irradiation one-surface measurement light, and is incident on the optical branching device 1020*u*. The twenty-second one-surface measurement light is incident on the optical branching device 1020*u* through the reflection mirror 1020*t*. The twelfth one-surface measurement light and the twenty-second one-surface measurement light incident on the optical branching device 1020*u* are coupled by the optical branching device 1020*u*, and thus optical heterodyne interference is performed. A resultant beat optical signal is emitted as a pre-irradiation one-surface interfering light from the output terminal 102*q*. Here, the optical branching device 102*p* functions as an optical coupling unit. The pre-irradiation one-surface interfering light of the beat optical signal emitted from the output terminal 102*q* is incident on the one-surface phase detection unit 105.

Also, to irradiate a plurality of positions P in a single measurement portion MP on the A surface of the workpiece 1 with a plurality of measurement lights, i.e., the eleventh one-surface measurement light in this embodiment, the eleventh one-surface measurement light is successively incident on the plurality of optical branching devices 1020, is diffracted by the optical branching devices, and is distributed into plural lights. Correspondingly, the twenty-first one-surface measurement light is successively incident on the plurality of optical branching devices 1020, and is successively distributed by the optical branching devices into plural lights. In this embodiment, as described above when the one-surface measurement unit 102A is described, the number of plurality of positions P is three. In particular, the eleventh one-surface measurement light is successively incident on the two optical branching devices 1020*b* and 1020*c*, is successively distributed by the optical branching devices 1020*b* and 1020*c*, and is distributed into three. Correspondingly, the twenty-first one-surface measurement light is successively incident on the two optical branching devices 1020*q* and 1020*r*, is successively distributed by the optical branching devices 1020*q* and 1020*r*, and is distributed into three.

The one of the eleventh one-surface measurement lights distributed by the optical branching device 1020*b* is incident as a primary eleventh one-surface measurement light on the polarization beam splitter 102*f* through the reflection mirror 1020*e*. The other of the eleventh one-surface measurement lights distributed by the optical branching device 1020*b* is incident on the optical branching device 1020*c* and is further distributed. The one of the eleventh one-surface measurement lights distributed by the optical branching device 1020*c* is incident as a secondary eleventh one-surface measurement light on the polarization beam splitter 102*f* through the reflection mirror 1020*f*. The other of the eleventh one-surface measurement lights distributed by the optical branching device 1020*c* is incident as a ternary eleventh one-surface measurement light on the polarization beam splitter 102*f* through the reflection mirrors 1020*d* and 1020*g*.

Here, the other of the eleventh one-surface measurement lights distributed by the optical branching device 1020*b* travels in the same direction, whereas the one of the eleventh one-surface measurement lights distributed by the optical branching device 1020*b* travels in a direction orthogonal to the traveling direction of the other of the eleventh one-surface measurement lights. The other of the eleventh one-surface measurement lights distributed by the optical branching device 1020*c* travels in the same direction, whereas the one of the eleventh one-surface measurement lights distributed by the optical branching device 1020*c* travels in a direction orthogonal to the traveling direction of the other of the eleventh one-surface measurement lights. The reflection mirrors 1020*d*, 1020*e*, 1020*f*, and 1020*g* emit the lights in directions substantially orthogonal to the traveling direction of the incident lights. Accordingly, the primary to ternary eleventh one-surface measurement lights directed from the reflection mirrors 1020*e*, 1020*f*, and 1020*g* toward the polarization beam splitter 102*f* travel in substantially the same directions.

Also, the one of the twenty-first one-surface measurement lights distributed by the optical branching device 1020*q* is incident as a primary twenty-first one-surface measurement light on the optical branching device 1020*o*. The other of the twenty-first one-surface measurement lights distributed by the optical branching device 1020*q* is incident on the optical branching device 1020*r* and is further distributed. Also, the one of the twenty-first one-surface measurement lights distributed by the optical branching device 1020*r* is incident as a secondary twenty-first one-surface measurement light on the optical branching device 1020*n*. The other of the twenty-first one-surface measurement lights distributed by the optical branching device 1020*r* is incident as a ternary twenty-first one-surface measurement light on the optical branching device 1020*m* through the reflection mirror 1020*s*.

Here, the other of the twenty-first one-surface measurement lights distributed by the optical branching device 1020*q* travels in the same direction, whereas the one of the twenty-first one-surface measurement lights distributed by the optical branching device 1020*q* travels in a direction orthogonal to the traveling direction of the other of the twenty-first one-surface measurement lights. The other of the twenty-first one-surface measurement lights distributed by the optical branching device 1020*r* travels in the same direction, whereas the one of the twenty-first one-surface measurement lights distributed by the optical branching device 1020*r* travels in a direction orthogonal to the traveling direction of the other of the twenty-first one-surface measurement lights. The reflection mirror 1020*s* emits a light in a direction orthogonal to a traveling direction of an incident light. Accordingly, the primary to ternary twenty-first one-surface measurement lights directed from the optical branching device 1020*q*, the optical branching device 1020*r*, and the reflection mirror 1020*s* toward the optical branching device 1020*o*, the optical branching device 1020*n*, and the optical branching device 1020*m* travel in substantially the same directions.

The primary to ternary eleventh one-surface measurement lights incident on the polarization beam splitter 102*f* from the reflection mirrors 1020*e*, 1020*f*, and 1020*g* are incident on the ¼ wave plate 102*g* through the polarization beam splitter 102*f*, are condensed by the lens 102*h*, and are irradiated on a plurality of (in this case, three) positions in a single measurement portion MP on the A surface of the workpiece 1. The plurality of eleventh one-surface measurement lights respectively reflected by the plurality of (in this case, three) positions P on the A surface of the workpiece 1 are incident as post-irradiation one-surface measurement lights on the lens 102*h* again, and are incident on the polarization beam splitter 102*f* through the ¼ wave plate 102*g*. The respective eleventh one-surface measurement lights (respective post-irradiation one-surface measurement lights) incident on the polarization beam splitter 102*f* are reflected in a predetermined direction, i.e., in this embodiment, in a direction orthogonal to a direction in which the eleventh one-surface measurement lights (the post-irradiation one-surface measurement lights) are directed from the A surface of the workpiece 1 toward the polarization beam splitter 102*f*.

The eleventh one-surface measurement lights (the post-irradiation one-surface measurement lights) emitted from the polarization beam splitter 102*f* are respectively reflected by the reflection mirrors 1020*j*, 1020*k*, and 10201, hence the traveling directions are bent at a substantially right angle, and the lights are respectively incident on the optical branching devices 1020*m*, 1020*n*, and 1020*o*. As described above, the twenty-first one-surface measurement lights from the reflection mirror 1020*s*, the optical branching device 1020*r*, and the optical branching device 1020*q* are also respectively incident on the optical branching devices 1020*m*, 1020*n*, and 1020*o*. The eleventh one-surface measurement lights and twenty-first one-surface measurement lights incident on the optical branching devices 1020*m*, 1020*n*, and 1020*o* are respectively coupled in the optical branching devices 1020*m*, 1020*n*, and 1020*o*, and optical heterodyne interference is perform. A plurality of (in this case, three) resultant beat optical signals are emitted as post-irradiation one-surface interfering lights from the output terminals 102*j* (102*j*-1 to 102*j*-3). Here, the optical branching devices 1020*m*, 1020*n*, and 1020*o* function as optical coupling units. The plurality of post-irradiation one-surface interfering lights of the beat optical signals emitted from the output terminals 102*j* (102*j*-1 to 102*j*-3) are incident on the one-surface phase detection unit 105.

With the one-surface measurement unit 102B thus configured, the first one-surface measurement light is branched into plural lights by one or plural, or in the example shown in FIG. 10, the two optical branching devices 1020*b* and 1020*c*; the second one-surface measurement light is branched into plural lights by one or plural, or in the example shown in FIG. 10, the two optical branching devices 1020*q* and 1020*r*; and hence the plurality of positions P are simultaneously measured by single emission of the one-surface measurement light. Since the one-surface measurement unit 102B thus configured uses the optical branching devices, there is high degree of freedom in optical design and adjustment. The limitation in optical design and adjustment can be reduced. As compared with the one-surface measurement unit 102A with the configuration shown in FIG. 9, in the one-surface measurement unit 102A, distances between the optical elements and distances at the plurality of positions are uniquely determined by parameters of the diffraction gratings 102*e* and 102*n* and the lens 102*h*. There is relatively low degree of freedom in optical design and adjustment. In contrast, with the one-surface measurement unit 102B with the configuration shown in FIG. 10, the optical axes of the respective optical elements can be individually adjusted. There is relatively less limitation in optical design and adjustment, and hence there is relatively high degree of freedom in optical design and adjustment.

Figure 11:
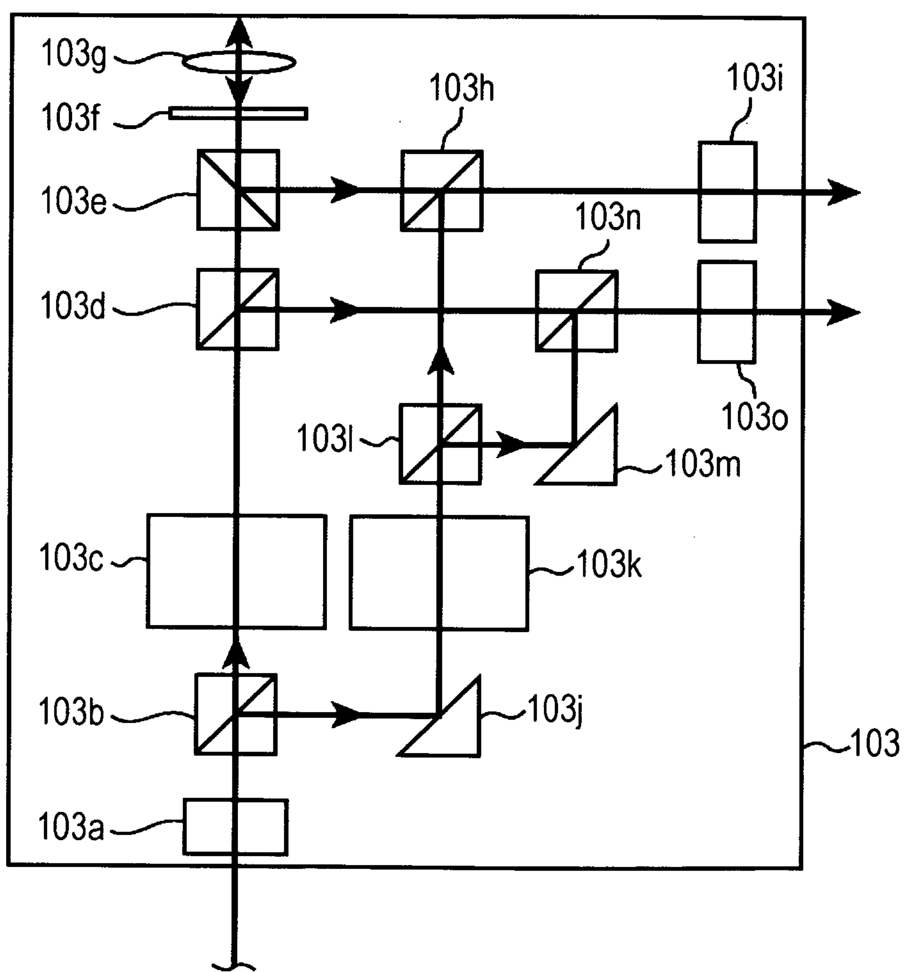
FIG. 11 is an illustration showing a configuration of an other-surface measurement unit in the profile measuring apparatus shown in FIG. 7.

Next, the other-surface measurement unit 103 is described. FIG. 11 is an illustration showing a configuration of the second measurement unit in the profile measuring apparatus according to the second embodiment.

The other-surface measurement unit (B measurement unit) 103 is a device that receives the other-surface measurement light from the light source unit 101 and acquires a beat optical signal, which contains surface profile information of the B surface of the workpiece 1, by optical heterodyne interferometry using the other-surface measurement light.

To be more specific, the other-surface measurement unit 103 is a measurement optical system that is arranged to face the B surface of the workpiece 1, that further branches the other-surface measurement light from the light source unit 101 into a first other-surface measurement light (B1 measurement light) and a second other-surface measurement light (B2 measurement light), that generates a post-irradiation other-surface interfering light (B post-irradiation interfering light), which is obtained by optical heterodyne interference by causing a post-irradiation other-surface measurement light (B post-irradiation measurement light), which is included in the branched first other-surface measurement light and is irradiated on and reflected by the B surface of the workpiece 1, to interfere with the branched second other-surface measurement light, and that generates a pre-irradiation other-surface interfering light (B pre-irradiation interfering light), which is obtained by optical heterodyne interference by causing a pre-irradiation other-surface measurement light (B pre-irradiation measurement light), which is included in the branched first other-surface measurement light and is before being irradiated on the B surface of the workpiece 1, to interfere with the branched second other-surface measurement light. With the other-surface measurement unit 103 thus configured, phases of the plurality of post-irradiation other-surface interfering lights can be measured with reference to the pre-irradiation other-surface interfering light.

To be further specific, the other-surface measurement unit 103 is an optical heterodyne interferometer that is arranged to face the B surface of the workpiece 1, that generates two first and second other-surface measurement lights with mutually different frequencies from the other-surface measurement light, that causes the first and second other-surface measurement lights to interfere with each other (optical heterodyne interference), and that generates a beat optical signal having a frequency which is the difference between frequencies of the first and second other-surface measurement lights. The other-surface measurement unit 103 is also a measurement optical system including a first other-surface optical path and a second other-surface optical path. In the first other-surface optical path, the first other-surface measurement light is irradiated on and reflected by the B surface of the workpiece 1, and in the second other-surface optical path, the first other-surface measurement light is not irradiated on the B surface of the workpiece 1, in a period from when the first and second other-surface measurement lights are generated from the other-surface measurement light to when the first and second other-surface measurement lights interfere with each other.

For example, as shown in FIG. 11, such a other-surface measurement unit 103 includes an input terminal 103*a*, optical branching devices 103*b*, 103*d*, 103*h*, 103*l*, and 103*n*, a polarization beam splitter 103*e*, optical wavelength shifters 103*c* and 103*k*, reflection mirrors 103*j* and 103*m*, a ¼ wave plate 103*f*, a lens 103*g*, and output terminals 103*i* and 103*o*.

With the other-surface measurement unit 103 thus configured, the other-surface measurement light incident on the input terminal 103*a* from the light source unit 101 through the polarization maintaining optical fiber is incident on the optical branching device 103*b*, and is distributed into two first and second other-surface measurement lights. The first other-surface measurement light travels in the same direction (a traveling direction of an incident light is the same as a traveling direction of an emitted light in the optical branching device 103*b*) and the second other-surface measurement light travels in a direction orthogonal to (perpendicular to) the traveling direction of the first other-surface measurement light. The first other-surface measurement light is incident on the optical wavelength shifter 103*c*, and then the wavelength (frequency) is shifted (changed). The second other-surface measurement light is incident on the optical wavelength shifter 103*k* through the reflection mirror 103*j*, and then the wavelength (frequency) is shifted (changed).

Also, the second other-surface measurement light emitted from the optical branching device 103*b* travels in the direction orthogonal to the traveling direction of the first other-surface measurement light by the optical branching device 103*b* in this embodiment. The traveling direction of the second other-surface measurement light is bent at a right angle by the reflection mirror 103*j*, and is aligned with the traveling direction of the first other-surface measurement light. The reflection mirror 103*j* is provided to align the traveling direction of the first other-surface measurement light emitted from the optical branching device 103*b* with the traveling direction of the second other-surface measurement light.

The first other-surface measurement light emitted from the wavelength shifter 103*c* (the first other-surface measurement light after the wavelength shift) is incident on the optical branching device 103*d*, and is distributed into two eleventh other-surface measurement light (B11 measurement light) and twelfth other-surface measurement light (B12 measurement light). The eleventh other-surface measurement light travels in the same direction, whereas the twelfth other-surface measurement light travels in a direction orthogonal to the traveling direction of the eleventh other-surface measurement light. The second other-surface measurement light emitted from the wavelength shifter 103*k* (the second other-surface measurement light after the wavelength shift) is incident on the optical branching device 102*l*, and is distributed into two B21 measurement light and B22 measurement light. The B21 measurement light travels in the same direction, whereas the B22 measurement light travels in a direction orthogonal to the traveling direction of the B21 measurement light.

The twelfth other-surface measurement light is a pre-irradiation other-surface measurement light, and is incident on the optical branching device 103*n*. The B22 measurement light is incident on the optical branching device 103*n* through the reflection mirror 103*m*. The twelfth other-surface measurement light and the B22 measurement light incident on the optical branching device 103*n* are coupled by the optical branching device 103*n*, and thus optical heterodyne interference is performed. A resultant beat optical signal is emitted as a pre-irradiation other-surface interfering light from the output terminal 103*o*. Here, the optical branching device 103*n* functions as an optical coupling unit. The pre-irradiation other-surface interfering light of the beat optical signal emitted from the output terminal 103*o* is incident on the other-surface phase detection unit 106.

The eleventh other-surface measurement light is incident on the ¼ wave plate 103*f* through the polarization beam splitter 103*e*, is condensed by the lens 103*g*, and is irradiated on the B surface of the workpiece 1. The eleventh other-surface measurement light reflected by the B surface of the workpiece 1 is incident as a post-irradiation other-surface measurement light on the lens 103*g* again, and is incident on the ¼ wave plate 103*f*. Accordingly, the presence of the ¼ wave plate 103*f* switches a polarization state (for example, P-polarized light or S-polarized light) of the eleventh other-surface measurement light irradiated on the B surface of the workpiece 1 from the polarization beam splitter 103*e*, and a polarization state (for example, S-polarized light or P-polarized light) of the eleventh other-surface measurement light reflected by the B surface of the workpiece 1 and being incident on the polarization beam splitter 103*e*. Thus, the eleventh other-surface measurement light incident on the polarization beam splitter 103*e* from the optical branching device 103*d* passes through the polarization beam splitter 103*e* toward the B surface of the workpiece 1, and the eleventh other-surface measurement light (post-irradiation other-surface measurement light) incident on the polarization beam splitter 103*e* through the lens 103*g* and the ¼ wave plate 103*f* from the B surface of the workpiece 1 is reflected in a predetermined direction, i.e., in this embodiment, in a direction orthogonal to a direction in which the eleventh other-surface measurement light (the post-irradiation other-surface measurement light) is directed from the B surface of the workpiece 1 toward the polarization beam splitter 103*e*.

The eleventh other-surface measurement light (the post-irradiation other-surface measurement light) emitted from the polarization beam splitter 103*e* is incident on the optical branching device 103*h*. The B21 measurement light distributed by the optical branching device 103*l* is also incident on the optical branching device 103*h*. The eleventh other-surface measurement light (the post-irradiation other-surface measurement light) and the B21 measurement light incident on the optical branching device 103*h* are coupled by the optical branching device 103*h*, and thus optical heterodyne interference is performed. A resultant beat optical signal is emitted as a post-irradiation other-surface interfering light from the output terminal 103*i*. Here, the optical branching device 103*h* functions as an optical coupling unit. The post-irradiation other-surface interfering light of the beat optical signal emitted from the output terminal 103*i* is incident on the other-surface phase detection unit 106.

The one-surface measurement unit 102 and the other-surface measurement unit 103 are arranged such that a measurement portion (measurement position) on the A surface of the workpiece 1 is aligned with a measurement portion (measurement position) on the B surface of the workpiece 1 on the front-and-back relationship. In particular, when orthogonal XYZ coordinate system including a Z-axis that is a thickness direction of the workpiece 1, and X- and Y-axes that are two mutually orthogonal directions in a horizontal plane orthogonal to the thickness direction is set, the one-surface measurement unit 102 and the other-surface measurement unit 103 are arranged to directly face each other such that X- and Y-coordinate values of any of a plurality of portions on the A surface of the workpiece 1 irradiated with the plurality of eleventh one-surface measurement lights (for example, a center portion from among the plurality of portions) correspond to X- and Y-coordinate values of a portion on the B surface of the workpiece 1 irradiated with the eleventh other-surface measurement light.

Figure 12:
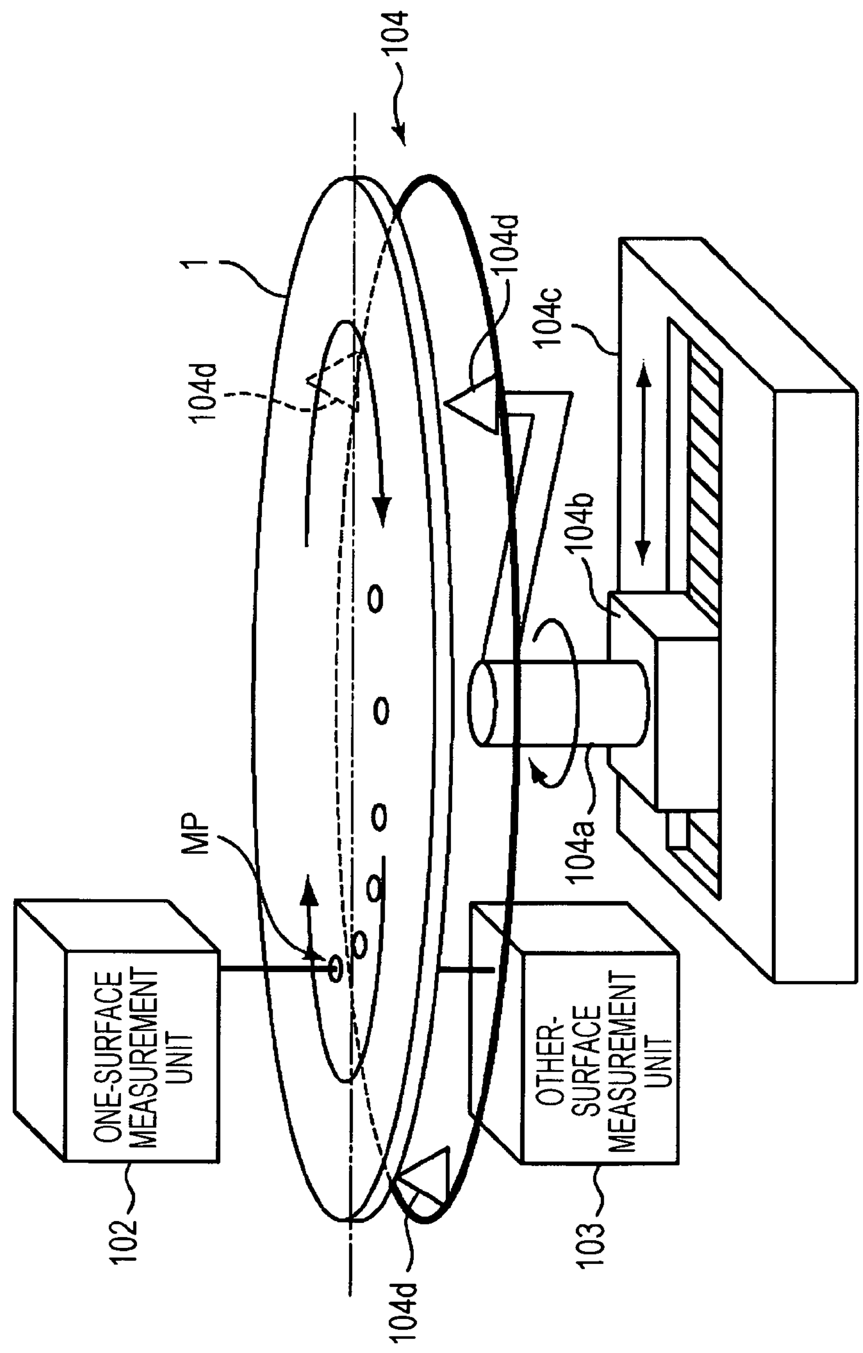
FIG. 12 illustrates a configuration of a stage in the profile measuring apparatus shown in FIG. 7.

Next, the stage 104 is described. FIG. 12 is an illustration showing a configuration of the stage in the profile measuring apparatus according to the second embodiment. The stage 104 is a device that moves the workpiece 1 in a horizontal direction orthogonal to the thickness direction of the workpiece 1 under the control by the arithmetic control unit 107. When the XYZ coordinate system is set as described above, the stage 104 may be an XY stage that moves the workpiece 1 in the X-axis direction and Y-axis direction. However, in this embodiment, if the workpiece 1 is a semiconductor wafer, since the semiconductor wafer has a disk-like shape, the stage 104 is a device than can rotate the workpiece 1 and move the workpiece 1 in a radial direction of the rotation. Therefore, a measurement value at a measurement portion is preferably expressed by a cylindrical coordinate system RθZ.

To be more specific, for example, as shown in FIG. 12, in order to measure the surface profile such as a thickness at a measurement portion MP of the workpiece 1 with high accuracy at high speed without being affected by vibration of the workpiece 1, the stage 104 includes support portions 104*d* that include a center member and three arm members extending in a radial direction from the center member, and that support an edge portion (edge region) of the disk-like workpiece 1 such as the semiconductor wafer by three points on the circumference at distal ends of the arm members; a rotation shaft 104*a* that is coupled with the center member of the support portions 104*d*; a rotational drive 104*b* that rotationally drives the rotation shaft 104*a*; and a linear drive 104*c* that linearly drives the rotational drive 104*b* within a predetermined moving range. These rotational drive 104*b* and linear drive 104*c* include driving mechanisms, for example, actuators such as servomotors and reduction gears.

With the stage 104 thus configured, the workpiece 1 is placed on the distal ends of the three arm members of the support portion 104*d* and is supported by the support portions 104*d* by three points. When the workpiece 1 is placed on the stage 104, the stage 104 is disposed with respect to the arrangement positions of the one-surface measurement unit 102 and the other-surface measurement unit 103 so that the one-surface measurement unit 102 and the other-surface measurement unit 103 can measure the A and B surfaces of the workpiece 1.

With the stage 104 thus configured, when the rotational drive 104*b* is rotated under the control by the arithmetic control unit 107, the support portion 104*d* is rotated through the rotation shaft 104*a*, and the workpiece 1 is rotated around the rotation shaft 104*a* (the center member of the support portion 104*d*). Then, when the rotational drive 104*b* linearly moves the rotational drive 104*b* under the control by the arithmetic control unit 107, the workpiece 1 moves in the radial direction. By using both rotational movement of the workpiece 1 by the rotational drive 104*b* and linear movement of the workpiece 1 by the linear drive 104*c*, a desirable measurement portion MP of the workpiece 1 can be measured within the moving range of the stage 104. Here, as described above, a single measurement portion MP is irradiated with the eleventh one-surface measurement light at a plurality of positions P by the one-surface measurement unit 102.

Figure 13:
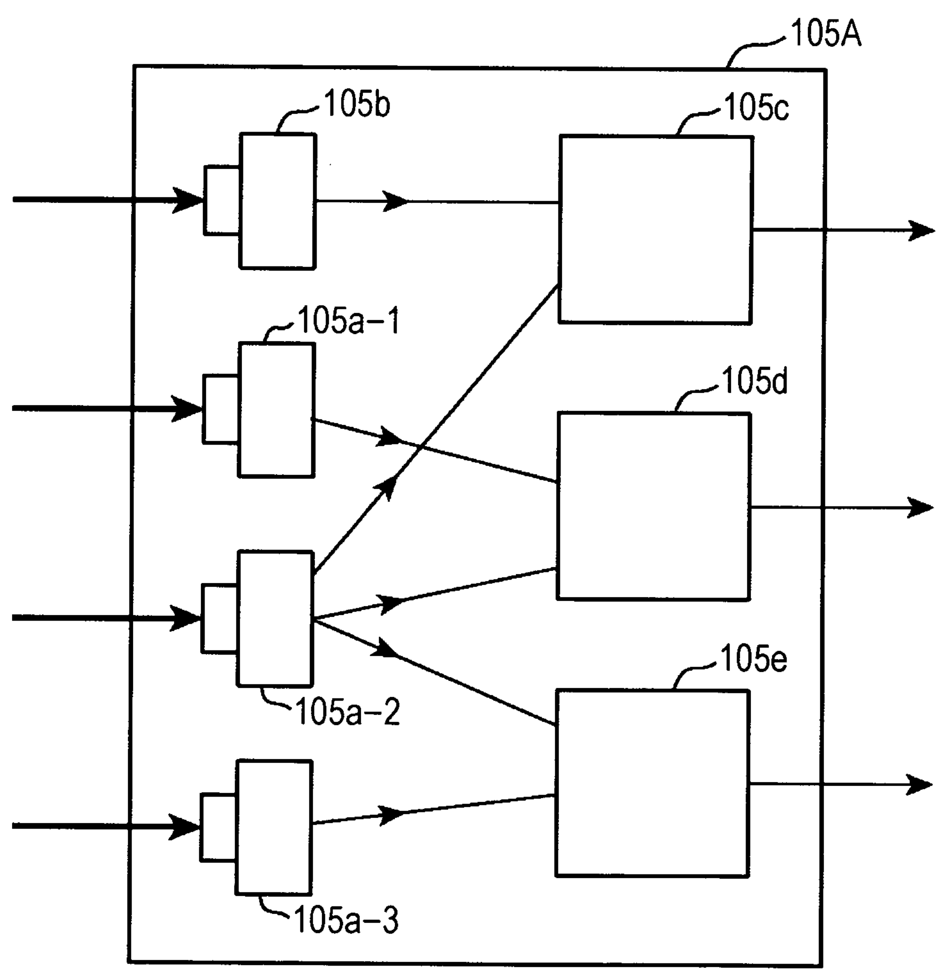
FIG. 13 is an illustration showing a configuration of a one-surface phase detection unit according to a first aspect in the profile measuring apparatus shown in FIG. 7.
Figure 14:
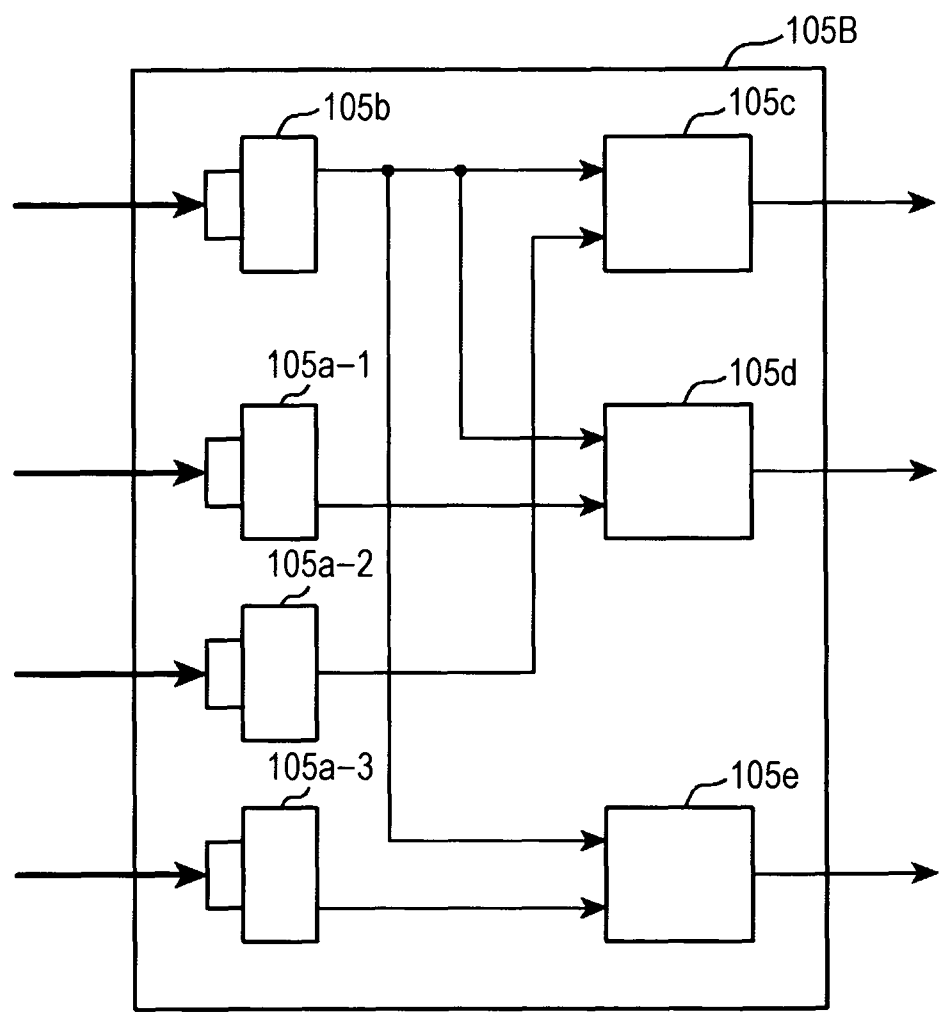
FIG. 14 is an illustration showing a configuration of a one-surface phase detection unit according to a second aspect in the profile measuring apparatus shown in FIG. 7.

Next, the one-surface phase detection unit (A phase detection unit) 105 is described. FIG. 13 is an illustration showing a configuration of a one-surface phase detection unit according to a first aspect in the profile measuring apparatus according to the second embodiment. FIG. 14 is an illustration showing a configuration of a one-surface phase detection unit according to a second aspect in the profile measuring apparatus according to the second embodiment.

The one-surface phase detection unit 105 is a device that detects a phase difference ΔΦA between each of the plurality of post-irradiation one-surface interfering lights obtained by the one-surface measurement unit 102 (102A, 102B) and the pre-irradiation one-surface interfering light. In this embodiment, three post-irradiation one-surface interfering lights are obtained from three measurement portions MPA1, MPA2, and MPA3. Hence, three phase differences ΔΦA1, ΔΦA2, and ΔΦA3 are detected.

As such a one-surface phase detection unit 105, a one-surface phase detection unit 105A according to a first aspect with the configuration shown in FIG. 13, or a one-surface phase detection unit 105B according to a second aspect with the configuration shown in FIG. 14 may be exemplified.

As shown in FIG. 13, the one-surface phase detection unit 105A according to the first aspect includes photoelectric converters 105*a* (105*a*-1, 105*a*-2, 105*a*-3) and 105*b*, and phase detectors 105*c*, 105*d*, and 105*e*.

The photoelectric converters 105*a* and 105*b* include photoelectric conversion elements such as photo diodes that convert incident lights into electric signals with signal levels corresponding to light quantities of the incident lights and output the electric signals. The photoelectric converters 105*a* are prepared in accordance with the number of the plurality of positions (measurement portion MP). The photoelectric converters 105*a* receive the plurality of post-irradiation one-surface interfering lights from the one-surface measurement unit 102 and output electric signals with signal levels corresponding to the light quantities of the lights as one-surface measurement beat signals (A measurement beat signals) SigA. In this embodiment, the number of positions is three, and hence the three photoelectric converters 105*a*-1, 105*a*-2, and 105*a*-3 are prepared. The photoelectric converters 105*a*-1, 105*a*-2, and 105*a*-3 respectively receive the three post-irradiation one-surface interfering lights emitted from the output terminals 102*j*-1, 102*j*-102, and 102*j*-3 of the one-surface measurement unit 102 through the multi-mode optical fibers and input terminals (not shown), and respectively output one-surface measurement beat signals SigA-1, SigA-2, and SigA-3 in accordance with the light quantities of the post-irradiation one-surface interfering lights. The photoelectric converter 105*b* receives the pre-irradiation one-surface interfering light from the one-surface measurement unit 102 through the multi-mode optical fiber and an input terminal (not shown), and outputs an electric signal with a signal level corresponding to the light quantity of the light as a one-surface reference beat signal (A reference beat signal) RefA.

The phase detectors 105*c*, 105*d*, and 105*e* are devices that detect phases among input signals. The phase detector 105*c* receives the one-surface reference beat signal RefA from the photoelectric converter 105*b* and the one-surface measurement beat signal SigA-2 from the photoelectric converter 105*a*-2, and detects a phase difference ΔΦAa2-*r* between the one-surface reference beat signal RefA and the one-surface measurement beat signal SigA-2. The phase detector 105*d* receives the one-surface signal beat signal SigA-1 from the photoelectric converter 105*a*-1 and the one-surface measurement beat signal SigA-2 from the photoelectric converter 105*a*-2, and detects a phase difference ΔΦAa1-*a*2 between the one-surface signal beat signal SigA-1 and the one-surface measurement beat signal SigA-2. The phase detector 105*e* receives the one-surface signal beat signal SigA-2 from the photoelectric converter 105*a*-2 and the one-surface measurement beat signal SigA-3 from the photoelectric converter 105*a*-3, and detects a phase difference ΔΦAa3-*a*2 between the one-surface signal beat signal SigA-2 and the one-surface measurement beat signal SigA-3. Based on the phase difference ΔΦAa2-*r*, phase difference ΔΦAa1-*a*2, and phase difference AAa3-*a*2, phase differences ΔΦA1, ΔΦA2, and ΔΦA3 between the plurality of post-irradiation one-surface interfering lights and the pre-irradiation one-surface interfering light obtained by the one-surface measurement unit 102 can be detected by arithmetic processing. The arithmetic processing may be executed by the one-surface phase detection unit 105A, or may be executed by the arithmetic control unit 107.

To omit the arithmetic processing, as shown in FIG. 14, the one-surface phase detection unit 105B according to the second aspect includes photoelectric converters 105*a* (105*a*-1, 105*a*-2, 105*a*-3) and 105*b*, and phase detectors 105*c*, 105*d*, and 105*e*. The phase detector 105*c* receives a one-surface reference beat signal RefA from the photoelectric converter 105*b* and a one-surface measurement beat signal SigA-2 from the photoelectric converter 105*a*-2, and outputs a phase difference ΔΦA2 between the one-surface measurement beat signal SigA-2 and the one-surface reference beat signal RefA. The phase detector 105*d* receives the one-surface reference beat signal RefA from the photoelectric converter 105*b* and an A measurement beat signal SigA-1 from the photoelectric converter 105*a*-1, and detects a phase difference ΔΦA1 between the one-surface measurement beat signal SigA-1 and the one-surface reference beat signal RefA. The phase detector 105*e* receives the one-surface reference beat signal RefA from the photoelectric converter 105*b* and a one-surface measurement beat signal SigA-3 from the photoelectric converter 105*a*-3, and detects a phase difference MDA3 between the one-surface measurement beat signal SigA-3 and the one-surface reference beat signal RefA.

Figure 15:
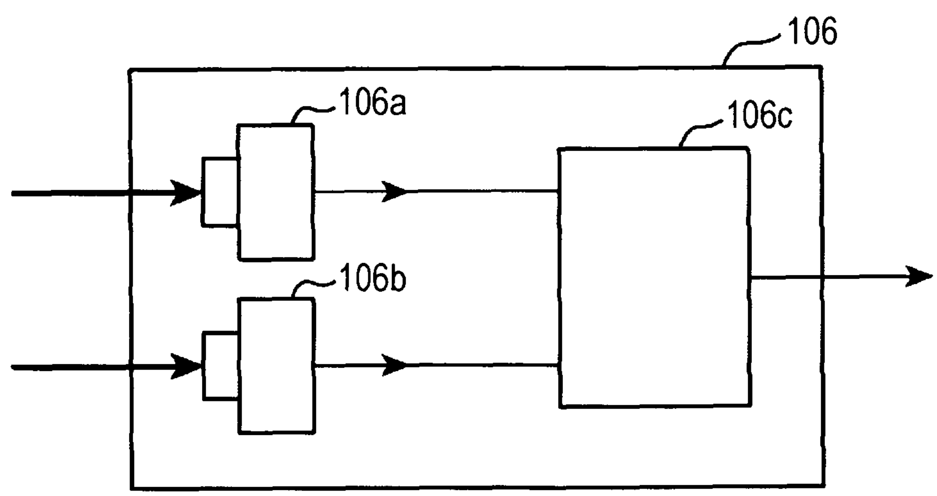
FIG. 15 is an illustration showing a configuration of an other-surface phase detection unit in the profile measuring apparatus shown in FIG. 7.

Next, the other-surface phase detection unit (B phase detection unit) 106 is described. FIG. 15 is an illustration showing a configuration of the other-surface phase detection unit in the profile measuring apparatus according to the second embodiment.

The other-surface phase detection unit 106 is a device that detects a phase difference ΔΦB between the post-irradiation other-surface interfering light and the pre-irradiation other-surface interfering light obtained by the other-surface measurement unit 103. To be more specific, for example as shown in FIG. 15, the other-surface phase detection unit 106 includes photoelectric converters 106*a* and 106*b*, and a phase detector 106*c*.

The photoelectric converter 106a includes a photoelectric conversion element such as a photo diode. The photoelectric converter 106a receives the post-irradiation other-surface interfering light from the other-surface measurement unit 103 through the multi-mode optical fiber and an input terminal (not shown), and outputs an electric signal with a level corresponding to the light quantity of the light as a other-surface measurement beat signal (B measurement beat signal) SigB. The photoelectric converter 106b includes a photoelectric conversion element such as a photo diode. The photoelectric converter 106b receives the pre-irradiation other-surface interfering light from the other-surface measurement unit 103 through the multi-mode optical fiber and an input terminal (not shown), and outputs an electric signal with a level corresponding to the light quantity of the light as a other-surface reference beat signal (B reference beat signal) RefB.

The phase detector 106c is a device that detects phases among the input signals. The phase detector 106c receives the other-surface reference beat signal RefB from the photoelectric converter 106b and the other-surface measurement beat signal SigB from the photoelectric converter 106a, and detects a phase difference ΔΦB between the other-surface reference beat signal RefB and the other-surface measurement beat signal SigB.

The arithmetic control unit 107 is a circuit that controls the respective portions of the profile measuring apparatus S according to their functions. For example, the arithmetic control unit 107 includes a ROM (Read Only Memory) that is a non-volatile memory or an EEPROM (Electrically Erasable Programmable Read Only Memory) that is a re-writable non-volatile memory, the memory storing a control program for controlling the respective portions of the profile measuring apparatus S according to their functions, various predetermined programs such as an arithmetic program for obtaining the surface profile of the workpiece 1 based on the outputs from the one-surface phase detection unit 105 and the other-surface phase detection unit 106, and various predetermined data etc. such as data required for executing the predetermined programs; a CPU (Central Processing Unit) that performs predetermined arithmetic processing and control processing by reading and executing the predetermined programs; a RAM (Random Access Memory) that stores data etc. generated during execution of the predetermined programs and hence serves as a working memory of the CPU; and a microcomputer etc. including peripheral circuits of the above components. The arithmetic control unit 107 includes, in terms of functions, a curvature calculator 1071, a profile calculator 1072, a stage controller 1073, a light source controller 1074, and a thickness calculator 1075.

The stage controller 1073 controls operation of the rotational drive 104b and the linear drive 104c of the stage 104 such that the workpiece 1 moves in the horizontal direction orthogonal to the thickness direction of the workpiece 1 to measure the plurality of measurement portions MP on the workpiece 1. The light source controller 1074 controls operation of the light source unit 101.

The thickness calculator 1075 obtains, as the thickness of the workpiece 1, a distance from the A surface to the B surface of the workpiece 1 from the phase difference between the one-surface phase that is obtained by the one-surface phase detection unit 105 by detecting the phases of the pre-irradiation one-surface interfering light and the post-irradiation one-surface interfering light generated by the one-surface measurement unit 102, and the other-surface phase that is obtained by the other-surface phase detection unit 106 by detecting the phases of the pre-irradiation other-surface interfering light and the post-irradiation other-surface interfering light generated by the other-surface measurement unit 103. To be more specific, the thickness calculator 1075 obtains, as the thickness of the workpiece 1, the distance from the A surface to the B surface of the workpiece 1 from the phase difference (ΔΦA-ΔΦB) between the one-surface phase difference ΔΦA that is obtained by the one-surface phase detection unit 105 by detecting the phases of the pre-irradiation one-surface interfering light and the post-irradiation one-surface interfering light generated by the one-surface measurement unit 102, and the other-surface phase difference ΔΦB that is obtained by the other-surface phase detection unit 106 by detecting the phases of the pre-irradiation other-surface interfering light and the post-irradiation other-surface interfering light generated by the other-surface measurement unit 103. The difference (ΔΦA−ΔΦB) is a value relating to the thickness of the workpiece 1. Based on approximation that the one-surface measurement light has a wavelength that is equivalent to a wavelength of the other-surface measurement light, when λ is the wavelength of the one-surface measurement light, the thickness D of the workpiece 1 is obtained by, for example, $D=(\Delta\Phi A+\Delta\Phi B)\times(\lambda/2)/(2\pi)$. The sign (sign between ΔΦA and ΔΦB) of the above expression may be any of a positive sign and a negative sign depending on the optical system. In general, if the one-surface measurement unit 102 and the other-surface measurement unit 103 are formed (configured) symmetrically, the sign is positive (+). In this embodiment, the one-surface and other-surface measurement lights are branched from the light of the same light source. Thus, the one-surface and other-surface measurement lights have the same wavelength.

The arithmetic control unit 107 obtains the surface profile of the workpiece 1 at the plurality of positions P in the measurement portion MP by obtaining the distances d (da, db, dc) from a predetermined reference plane to the one surface (A surface) of the workpiece 1 respectively at the plurality of positions P in the measurement portion MP. In this embodiment, as the surface profile of the workpiece 1, for example, a curvature and an arc based on the curvature are obtained by the curvature calculator 1071 and profile calculator 1072.

Figure 16:
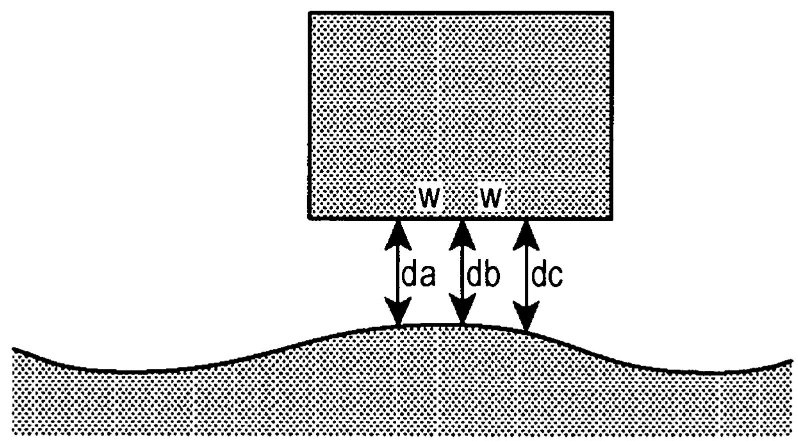
FIG. 16 is an illustration for explaining a method for calculating a curvature.

The curvature calculator 1071 obtains the curvature at the plurality of positions P, i.e., obtains the curvature in the measurement portion MP, based on the distances d (da, db, dc) from the predetermined reference plane to the one surface (A surface) of the workpiece 1 respectively at the plurality of positions P in the measurement portion MP. In this embodiment, the positions P are the three positions. As shown in FIG. 16, the curvature calculator 1071 calculates a curvature CF by $CF=(2db-da-dc)/(w^2)$. Here, da is a distance from the predetermined reference plane to the one surface of the workpiece 1 at a first position Pa, db is a distance from the predetermined reference plane to the one surface of the workpiece 1 at a second position Pb, and dc is a distance from the predetermined reference plane to the one surface of the workpiece 1 at a third position Pc. The distances da, db, and dc are not absolute values that directly express the actual distances, but are relative values from the reference plane. The distance da is obtained by $da=(\Delta\Phi A1/(2\pi)+n1)\times(\lambda/2)+N1$, the distance db is obtained by $db=(\Delta\Phi A2/(2\pi)+n2)\times(\lambda/2)+N2$, and the distance dc is obtained by $dc=(\Delta A3/(2\pi)+n3)\times(\lambda/2)+N3$. In this way, a distance d from the predetermined reference plane to the one surface of the workpiece 1 is obtained by, for example, $d=(\Delta\Phi A/(2\pi)+n)\times(\lambda/2)+N$. The reference plane is a horizontal plane that is horizontal with respect to the optical axis of the measurement light emitted by the one-surface measurement unit 102, and is set at any position along the optical axis. Constants N, N1, N2, and N3 are initial values for the reference plane. For example, the constants N, N1, N2, and N3 are previously measured every time when the workpiece 1 is measured, and are stored in the profile measuring apparatus S. Also, numerical values n, n1, n2, and n3 express variations, by integral multiple of the phases, with respect to the initial values in case of continuous measurement. Also, w is a distance (planar direction) between adjacent measurement-light irradiation positions. The reciprocal of the curvature CF is a curvature radius CFR.

The profile calculator 1072 obtains a surface height distribution of the workpiece 1 as the surface profile, by connecting arcs obtained from the curvatures at the plurality of measurement portions MP obtained by the curvature calculator 1071. For example, by using a curvature radius CFR corresponding to a curvature CF obtained by the curvature calculator 1071 at a position P located at the center position from among a plurality of positions P in a measurement portion MP, an arc containing the center position P is obtained as an arc in the measurement portion MP, and arcs in respective measurement portions MP are connected.

The input unit 8 is, for example, a device that inputs commands for instructing measurement start etc. and data such as attribute information etc. of the measurement object. For example, the input unit 8 is an operation panel or a keyboard including a plurality of input switches. The output unit 9 is a device that outputs the commands and data received by the input unit 8 and measurement results etc. For example, the output unit 9 is a display device, such as a CRT display, an LCD (liquid crystal display), an organic EL display, or a plasma display, or a print device such as a printer. The input unit 8 and output unit 9 are connected to the arithmetic control unit 107.

Figure 17:
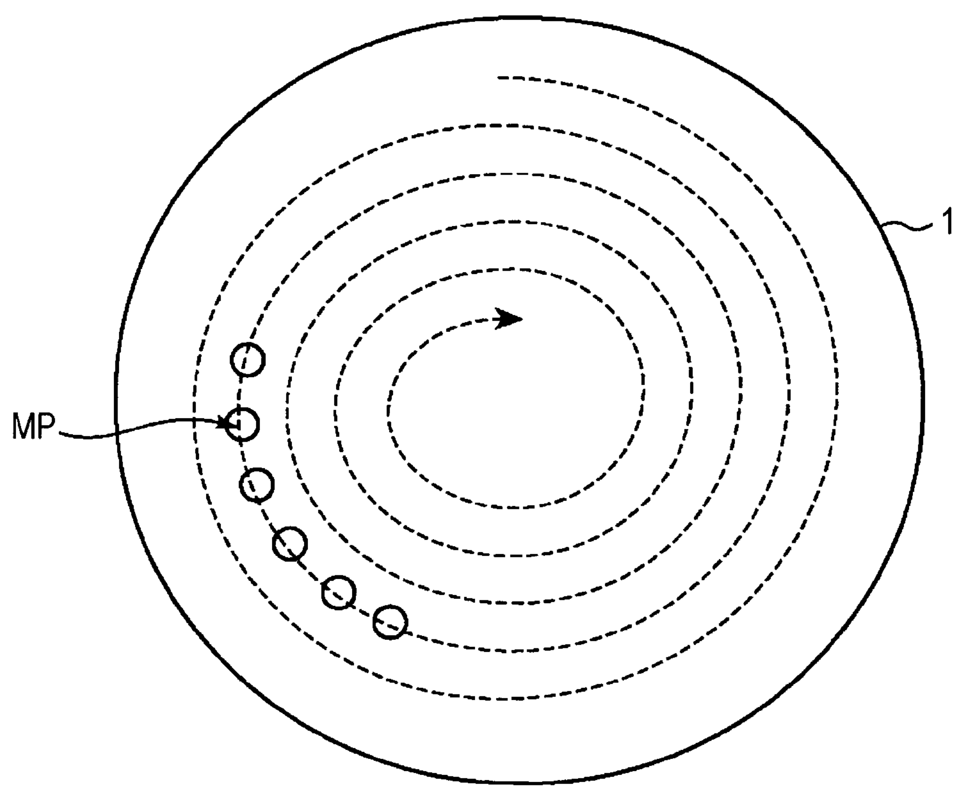
FIG. 17 is an illustration for explaining measurement portions when a surface profile of a measurement object is measured by using the profile measuring apparatus shown in FIG. 7.
Figure 18:
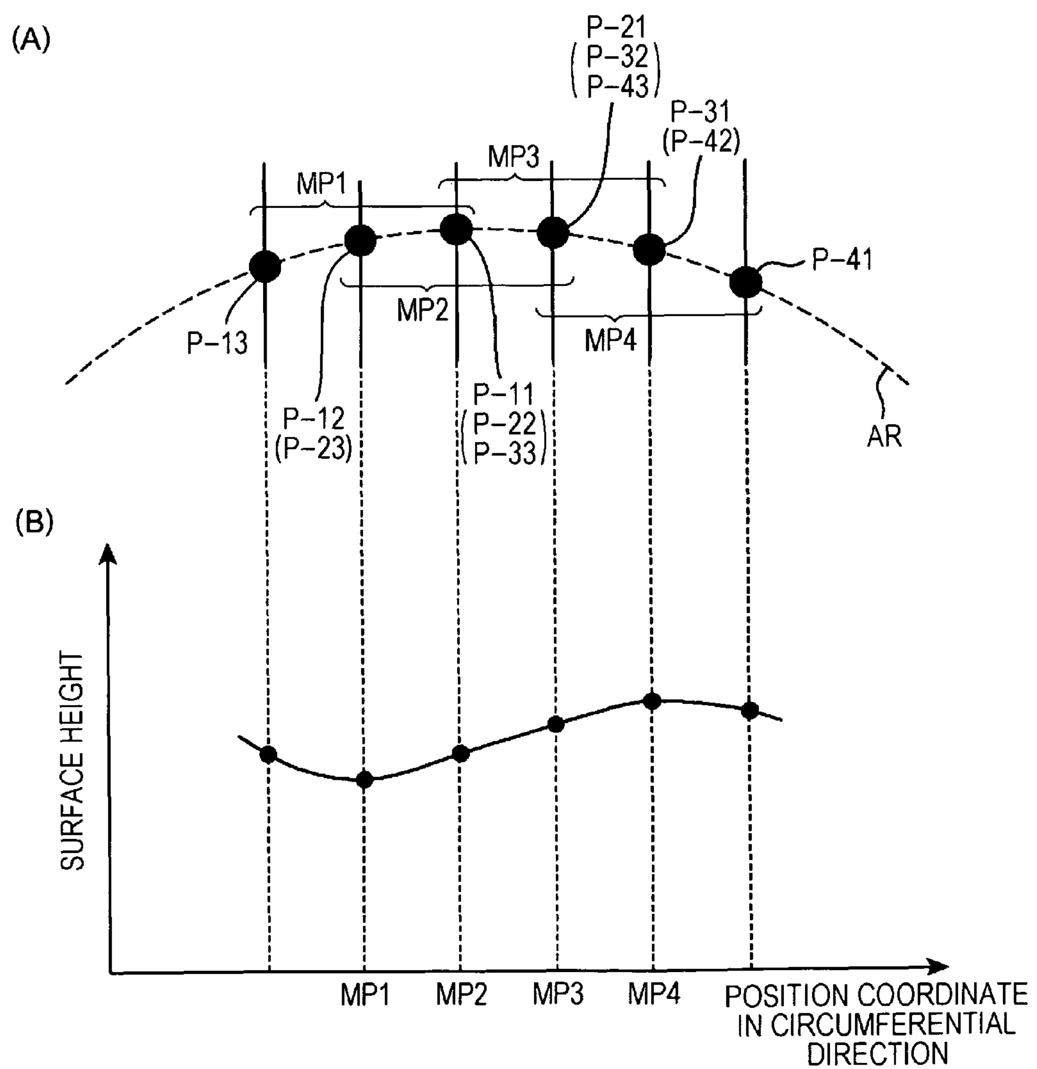
FIG. 18 is an illustration for explaining a plurality of positions in measurement portions and measurement results when the surface profile of the measurement object is measured by using the profile measuring apparatus shown in FIG. 7.

Next, operation of the profile measuring apparatus S in this embodiment is described. FIG. 17 is an illustration for explaining measurement portions when a surface profile of a measurement object is measured by using the profile measuring apparatus according to the second embodiment. Open circles in FIG. 17 represent measurement portions MP, and a broken line represents a locus of the measurement portions MP. FIG. 18 is an illustration for explaining a plurality of positions P in each measurement portion MP and measurement results when a surface profile of a measurement object is measured by using the profile measuring apparatus according to the second embodiment. FIG. 18(A) is an illustration for explaining the plurality of positions P in each measurement portion MP, and FIG. 18(B) is an illustration showing the measurement results for each measurement portion MP. Closed circles in FIG. 18(A) represent a plurality of positions P in each measurement portion, and an arcuate broken line represents a locus of the measurement portion MP. The horizontal axis of FIG. 18(B) plots a position coordinate in the circumferential direction of the workpiece 1, and the vertical axis plots a surface height. Black dots in FIG. 18(B) represent the measurement results. Also, straight solid lines and broken lines in FIG. 18 represent correspondence between FIGS. 18(A) and 18(B). In the following description, the number of positions P in each measurement portion MP is three for convenience of the description.

When a power supply switch (not shown) is turned ON, the profile measuring apparatus S is started, and the arithmetic control unit 107 performs required initialization for respective portions. Then, for example, when a plate-like workpiece 1 such as a semiconductor wafer is placed on the stage 104, and when the arithmetic control unit 107 receives a command for instructing measurement start from the input unit 8, the arithmetic control unit 107 starts measurement for the surface profile of the workpiece 1.

First, the light source controller 1074 of the arithmetic control unit 107 drives the light source unit 101 to cause the single-wavelength laser light source 101*a* to emit the predetermined laser light. With the emission of the predetermined laser light by the single-wavelength laser light source 101*a*, because of the action of the optical system, the one-surface measurement light and the other-surface measurement light are respectively emitted from the output terminal 101*e* and the output terminal 101*g* of the light source unit 101.

Then, the one-surface measurement light emitted from the output terminal 101*e* of the light source unit 101 propagates through the polarization maintaining optical fiber, and is incident on the one-surface measurement unit 102. The one-surface measurement unit 102 generates the pre-irradiation one-surface interfering light and three post-irradiation one-surface interfering lights by the action of the optical system from the incident one-surface measurement light, and emits the lights from the output terminal 102*q* and the three output terminals 102*j*-1 to 102*j*-3. Then, the pre-irradiation one-surface interfering light and the three post-irradiation one-surface interfering lights respectively emitted from the output terminal 102*q* and the three output terminals 102*j*-1 to 102*j*-3 of the one-surface measurement unit 102 propagate through the multi-mode optical fibers, and are incident on the one-surface phase detection unit 105. The one-surface phase detection unit 105 generates data that relates to or represents the phase differences ΔΦA1, ΔΦA2, and ΔΦA3 between the pre-irradiation one-surface interfering light and the three post-irradiation one-surface interfering lights by the phase detection for the pre-irradiation one-surface interfering light and the three post-irradiation one-surface interfering lights.

In contrast, the other-surface measurement light emitted from the output terminal 101*g* of the light source unit 101 propagates through the polarization maintaining optical fiber, and is incident on the other-surface measurement unit 103. The other-surface measurement unit 103 generates the pre-irradiation other-surface interfering light and the post-irradiation other-surface interfering light by the action of the optical system from the incident other-surface measurement light, and emits the lights from the output terminal 103*o* and the output terminal 103*i*. Then, the pre-irradiation other-surface interfering light and the post-irradiation other-surface interfering light respectively emitted from the output terminal 103*o* and the output terminal 103*i* of the other-surface measurement unit 103 propagate through the multi-mode optical fibers and are incident on the other-surface phase detection unit 106. The other-surface phase detection unit 106 generates data that represents the phase difference ΔΦB between the pre-irradiation other-surface interfering light and the post-irradiation other-surface interfering light by the phase detection of the pre-irradiation other-surface interfering light and the post-irradiation other-surface interfering light.

When the one-surface measurement unit 102 and the one-surface phase detection unit 105, and the other-surface measurement unit 103 and the other-surface phase detection unit 106 perform such operation, the stage controller 1073 of the arithmetic control unit 107 controls the stage 104 to move the workpiece 1 in the horizontal direction orthogonal to the thickness direction of the workpiece 1.

To be more specific, for example, in this embodiment, the stage controller 107 controls the rotational drive 104*b* of the stage 104 to rotate the workpiece 1, and controls the linear drive 104*c* of the stage 104 to move the workpiece 1 in the linear direction. While the stage controller 1073 controls the stage 104, the arithmetic control unit 107 acquires data of the phase differences ΔΦA1, ΔΦA2, ΔΦA3, and ΔΦB from the one-surface phase detection unit 105 and the other-surface phase detection unit 106 every time when the position of the measurement portion MP is at a predetermined position. With this operation, as shown in FIG. 17, the phase differences ΔΦA1, ΔΦA2, ΔΦA3, and ΔΦB are acquired at each measurement portion MP on the workpiece 1 while the position of the measurement portion MP is successively changed on the workpiece 1 such that the locus of the positions of the plurality of measurement portions MP draws a spiral. Also, for example, the stage controller 107 controls the rotational drive 104*b* of the stage 104 to rotate the workpiece 1, and during this, the arithmetic control unit 107 acquires data of the phase differences ΔΦA1, ΔΦA2, ΔΦA3, and ΔΦB from the one-surface phase detection unit 105 and the other-surface phase detection unit 106 every time when the position of the measurement portion MP is at a predetermined position. Then, when the workpiece 1 is rotated, by controlling the linear drive 104*c* of the stage 104, the workpiece 1 is moved in the linear direction only by a predetermined distance. When the workpiece 1 is moved in the linear direction by the predetermined distance, while the workpiece 1 is rotated, the arithmetic control unit 107 acquires data of the phase differences ΔΦA1, ΔΦA2, ΔΦA3, and ΔΦB at a predetermined position. With this operation, the data of the phase differences ΔΦA1, ΔΦA2, ΔΦA3, and ΔΦB in each measurement portion MP at each position on circumferences with different radii can be obtained.

In the above-described profile measuring apparatus S, the stage controller 1073 of the arithmetic control unit 107 may control the stage 104 to move the workpiece 1 in the horizontal direction so that at least two of a plurality of positions P before the movement overlap two of a plurality of positions P after the movement, and data of the phase differences ΔΦA1, ΔΦA2, ΔΦA3, and ΔΦB may be acquired from the one-surface phase detection unit 105 and the other-surface phase detection unit 106.

Also, in the above-described profile measuring apparatus S, the stage controller 1073 of the arithmetic control unit 107 may control the stage 104 such that a plurality of positions P are arranged in the moving direction and a distance between two positions adjacent to each other in the moving direction is uniform, and data of the phase differences ΔΦA1, ΔΦA2, ΔΦA3, and ΔΦB may be acquired from the one-surface phase detection unit 105 and the other-surface phase detection unit 106.

For example, if the locus of the positions of measurement portions MP draws a spiral, the stage controller 1073 controls the rotational drive 104*b* such that the workpiece 1 rotates at a constant angular speed in the circumferential direction, and controls the linear drive 104*c* such that the workpiece 1 moves at a constant speed in the linear direction. Also in this case, the stage 104 is controlled to rotate the workpiece 1 in the circumferential direction and to move the workpiece 1 in the linear direction so that at least two of the plurality of positions P before the movement overlap two of the plurality of positions P after the movement. Alternatively, if the positions of the measurement portions MP are arranged on a circumference, the stage controller 1073 controls the rotational drive 104*b* such that the workpiece 1 rotates at a constant angular speed in the circumferential direction, and when one rotation is completed, the stage controller 1073 controls the linear drive 104*c* such that the workpiece 1 moves by a predetermined distance in the linear direction. The arithmetic control unit 107 acquires data of the phase differences ΔΦA1, ΔΦA2, ΔΦA3, and ΔΦB from the one-surface phase detection unit 105 and the other-surface phase detection unit 106 at a constant interval.

Since the stage controller 1073 controls the stage 104 and also controls the timing for the data acquisition by the arithmetic control unit 107, for example, if the two of the plurality of positions P before the movement overlap the two of the plurality of positions P after the movement, and if the distance between the two positions adjacent to each other in the moving direction is uniform (if the distance of positions on a curve (arc) AR is uniform), the plurality of positions P in each measurement portion PM become positions shown in FIG. 18(A). In the example shown in FIG. 18(A), data of phase differences is acquired at three positions P-11, P-12, and P-13 on a curve (arc) AR in a first measurement portion MP1, and data of phase differences is acquired at three positions P-21, P-22, and P-23 on a curve AR in a second measurement portion MP2. Here, the position P-22 overlaps the position P-11, and the position P-23 overlaps the position P-12. Data of phase differences is acquired at three positions P-31, P-32, and P-33 on a curve (arc) AR in a third measurement portion MP1. Here, the position P-32 overlaps the position P-21, and the position P-33 overlaps the positions P-22 and P-11. Also, data of phase differences is acquired at three positions P-41, P-42, and P-43 on a curve (arc) AR in a fourth measurement portion MP4. Here, the position P-42 overlaps the position P-31, and the position P-43 overlaps the positions P-32 and P-21.

Then, when the data of the phase differences ΔΦA1, ΔΦA2, ΔΦA3, and ΔΦB is acquired, the thickness calculator 1075 of the arithmetic control unit 107 obtains a thickness D in a measurement portion MP, for example, a thickness D at the position Pb, and hence obtains the thickness D of the workpiece 1 in the measurement portion MP.

Then, the curvature calculator 1071 of the arithmetic control unit 107 obtains a curvature CF in the measurement portion MP by the above-described arithmetic expression based on the distances da, db, and dc of the workpiece 1 at the three positions Pa, Pb, and Pc in the measurement portion MP.

Then, the profile calculator 1072 of the arithmetic control unit obtains a surface height distribution of the workpiece 1, by connecting arcs obtained from curvatures CF at a plurality of measurement portions MP obtained by the curvature calculator 1071. For example, as indicated by solid lines shown in FIG. 18(B), by connecting arcs acquired by curvatures CF1 to CF4 in the four first to fourth measurement portions MP1 to MP4, the surface height distribution of the workpiece 1 is obtained.

Then, the arithmetic control unit 107 outputs, as the surface profile of the workpiece 1, the thickness distribution, curvatures, and surface height distribution thus obtained to the output unit 9. The output unit 9 displays, as the surface profile of the workpiece 1, the thickness distribution, curvatures, and surface height distribution.

With this operation, the profile measuring apparatus S and the profile measuring method according to this embodiment measure the distances from the one surface to the other surface of the workpiece 1 by the optical heterodyne interferometry at the plurality of positions P in the measurement portion MP on the one surface of the workpiece 1, and hence can obtain the thickness and surface profile of the workpiece 1 by a single measurement. The profile measuring apparatus S and the profile measuring method with this configuration can measure the thickness and surface profile of the workpiece 1 with further high accuracy. For example, the profile measuring apparatus S and the profile measuring method with this configuration can perform accurate measurement with a nanometer level. The profile measuring apparatus S and the profile measuring method with this configuration can be preferably used in, for example, a manufacturing factory for semiconductor wafers for product inspection etc. during manufacturing or after manufacturing.

Also, in the above-described profile measuring apparatus S and profile measuring method, the thickness of the workpiece 1 is scanned while the stage 104 moves the workpiece 1 in the horizontal direction. Accordingly, the profile measuring apparatus S and the profile measuring method with this configuration can measure the thickness distribution of the workpiece 1 with further high accuracy in the scanning range.

Also, the above-described profile measuring apparatus S and profile measuring method can measure the curvature CF of the surface of the workpiece 1 as the surface profile of the workpiece 1.

Also, in the above-described profile measuring apparatus S and profile measuring method, the plurality of arcs acquired by the plurality of curvatures CF are connected. Accordingly, the profile measuring apparatus S and the profile measuring method with this configuration can measure the surface height distribution of the workpiece 1 as the surface profile of the workpiece 1, and hence the surface profile of the workpiece 1 can be reproduced.

Also, in the above-described profile measuring apparatus S and profile measuring method, at least two of the plurality of positions before the movement overlap two of the plurality of positions after the movement. Accordingly, the profile measuring apparatus S and the profile measuring method with this configuration can easily continuously measure the surface profile of the workpiece 1.

Also, in the above-described profile measuring apparatus S and profile measuring method, a distance between two positions P adjacent to each other in the moving direction is uniform. Accordingly, the profile measuring apparatus S and the profile measuring method with this configuration can easily control the stage 104, and can measure the surface profile of the workpiece 1 at a constant interval.

Also, in the above-described profile measuring apparatus S, the one-surface optical modulator and the other-surface optical modulator are not provided in the light source unit 101, the one-surface measurement unit 102 includes therein, i.e., in its casing, the wavelength shifters 102*c* and 102*l* as an example of the one-surface optical modulator, and the other-surface measurement unit 103 includes therein, i.e., in its casing, the wavelength shifters 103*c* and 103*k* as an example of the other-surface optical modulator. Accordingly, with the profile measuring apparatus S thus configured, fluctuation is not generated in phase of the light for the optical heterodyne interference in the optical path from the light source unit 101 to the one-surface measurement unit 102, and fluctuation in phase is not generated at the light for the optical heterodyne interference in the optical path from the light source unit 101 to the other-surface measurement unit 103. Therefore, the profile measuring apparatus S can measure the surface profile of the workpiece 1 with further high accuracy.

Figure 19:
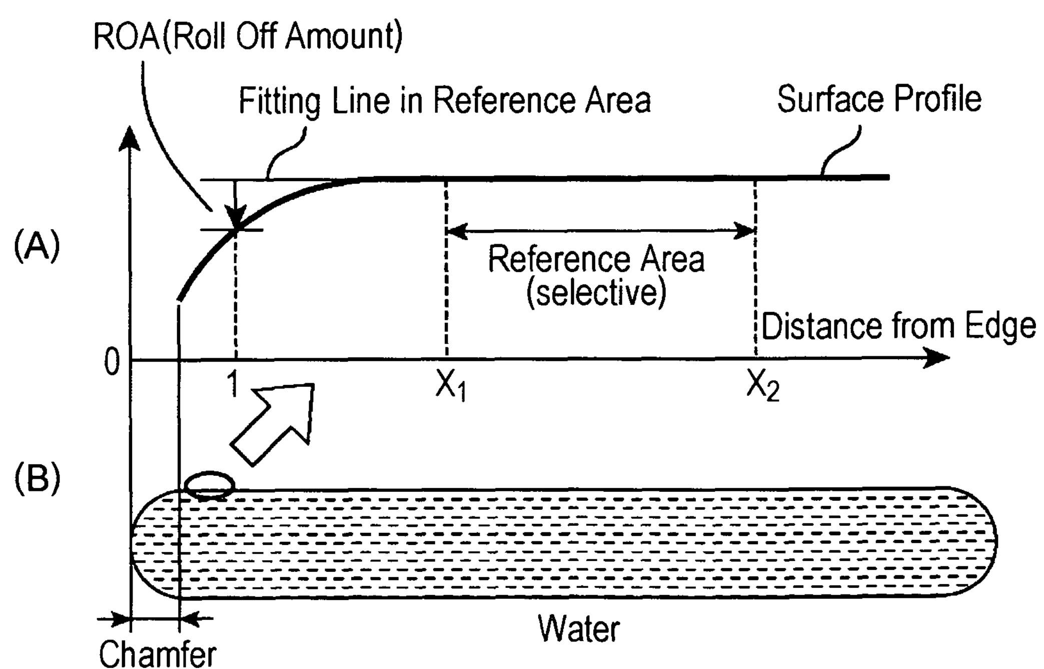
FIG. 19 is an illustration for explaining edge roll-off.

In the profile measuring apparatus S according to the second embodiment, an index indicative of edge roll-off may be obtained by the arithmetic control unit 107. FIG. 19 is an illustration for explaining edge roll-off. FIG. 19(A) is a schematic illustration showing a surface profile of a wafer. FIG. 19(B) is a vertically sectioned schematic illustration of the wafer. The horizontal axis in FIG. 19(A) plots a distance from an edge of the wafer, and the vertical axis plots a height.

As shown in FIG. 19, the semiconductor wafer has a chamfered portion called chamfer at the outermost portion. For example, in case of a 300-mm wafer, a chamfered portion is a region extending by about 0.3 to 0.5 mm from a physical edge. The edge roll-off is a region extending by several millimeters from the inside of the chamfered portion. The edge roll-off is generated due to various factors, and a main factor is a grinding process of the semiconductor wafer. As shown in FIG. 19, the edge roll-off generally has a "sagging shape," however, the edge roll-off may have a "bulging shape" instead of the "sagging shape" depending on the condition.

For example, as an evaluation method for the edge roll-off, there is an evaluation value called ROA (Roll-off Amount) suggested by Kimura et al. As shown in FIG. 19(A), a reference plane is obtained from a profile of the semiconductor wafer at a position at about 3 to 6 mm from the physical edge of the semiconductor wafer (reference area), in which the semiconductor wafer is considered to be flat. Then, the evaluation value is defined as a distance between a profile of the semiconductor wafer at a position at about 1 mm and the reference plane. The evaluation value ROA is an index indicative of the amount of sagging or bulging of the outer edge portion of the semiconductor wafer.

To obtain the evaluation value ROA that is the index for the edge roll-off, the profile measuring apparatus S may be configured as follows. The one-surface measurement unit 102 is configured such that the plurality of positions P in the measurement portion MP are arranged along the radial direction, and the arithmetic control unit 107 further includes, in terms of a function, an evaluation-value calculator that obtains the evaluation value ROA by using the surface height distribution of the workpiece 1 obtained by the profile calculator 1072. Since the profile measuring apparatus S further includes the evaluation-value calculator, the evaluation value ROA of the edge roll-off can be obtained. Thus, by referencing the evaluation value ROA of the edge roll-off, a region, in which dies that meet the predetermined process rule can be manufactured, can be properly set in a semiconductor wafer.

Also, in the above-described second embodiment, the profile measuring apparatus S performs the measurement at the plurality of positions P only on the A surface. However, the measurement may be performed on the B surface at a plurality of positions Q that directly face the plurality of positions P on the A surface. In this case, the other-surface measurement unit 103 is configured similarly to the one-surface measurement unit 102, and the arithmetic control unit 107 obtains the surface profile of the workpiece 1 by using data of phase differences at the mutually facing positions on the A and B surfaces.

Figure 20:
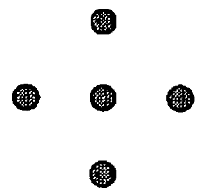
FIG. 20 is illustrations for explaining pluralities of positions in measurement portions according to first to third aspects.
Figure 20:
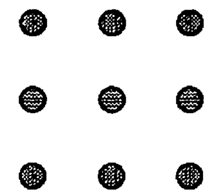

Also, in the above-described second embodiment, the number of the plurality of positions P in the measurement portion MP is three. However, it is not limited thereto. FIG. 20 is an illustration for explaining a plurality of positions in measurement portions according to first to third aspects. FIG. 20(A) illustrates a plurality of positions P in a measurement portion MP according to a first aspect, FIG. 20(B) illustrates a plurality of positions P in a measurement portion MP according to a second aspect, and FIG. 20(C) illustrates a plurality of positions P in a measurement portion MP according to a third aspect. In FIG. 20, closed circles represent positions P.

In the first aspect, as shown in FIG. 20(A), the number of the plurality of positions P in the measurement portion MP is three like the above-described second embodiment. The distance between two adjacent positions P is, for example, 500 μm.

Also, in the second aspect, as shown in FIG. 20(B), the number of the plurality of positions P in the measurement portion MP is five and the positions P are arranged in a cross form. With this second aspect, for example, in case of the one-surface measurement unit 102A of the first aspect shown in FIG. 9, the profile measuring apparatus S is configured such that two diffraction gratings whose diffraction directions are orthogonal to each other are used instead of the diffraction gratings 102*e* and 102*n*, and five output terminals 102*j* receive five post-irradiation one-surface interfering lights in an array of a cross form from among an eleventh one-surface measurement light and a twenty-first one-surface measurement light (post-irradiation one-surface interfering lights) which are diffracted in a two-dimensional array form by the two diffraction gratings.

Also, in the third aspect, as shown in FIG. 20(C), the number of the plurality of positions P in the measurement portion MP is nine and the positions P are arranged in a two-dimensional array form including three rows and three columns. With this third aspect, for example, in case of the one-surface measurement unit 102A of the first aspect shown in FIG. 9, the profile measuring apparatus S is configured such that two diffraction gratings whose diffraction directions are orthogonal to each other are used instead of the diffraction gratings 102*e* and 102*n*, and nine output terminals 102*j* receive nine post-irradiation one-surface interfering lights in a two-dimensional array form including the three rows and three columns from among an eleventh one-surface measurement light and a twenty-first one-surface measurement light (post-irradiation one-surface interfering lights) which are diffracted in a two-dimensional array form by the two diffraction gratings.

If the plurality of positions P in the measurement portion MP are two-dimensionally arranged like the second or third aspect, the surface profile of the workpiece 1 can be two-dimensionally measured in a single measurement portion MP.

The configuration relating to the technique that measures the surface profile in the profile measuring apparatus S according to the second embodiment may be installed in the profile measuring apparatus X according to the first embodiment, or may be mounted on the profile measuring apparatus X according to the first embodiment.

While this description discloses the techniques according to the various aspects, main techniques included in the techniques are summarized as follows.

A profile measuring apparatus according an aspect is a measuring apparatus that is used for scanning front and back surfaces of a workpiece and measuring a thickness distribution of the workpiece in a non-contact manner, and that includes components (1) to (11).

(1) First optical branching means for branching a source light that is emitted from a predetermined light source into two lights.

(2) Optical guiding means for guiding the branched lights by the first optical branching means in directions toward measurement portions on the front and back surfaces of the workpiece, the measurement portions facing each other.

(3) Second optical branching means for further branching each of the branched lights of the source light guided in the directions toward the measurement portions on each of front and back of the workpiece into two lights.

(4) Optical modulating means for modulating a frequency or frequencies of one of or both the branched lights by the second optical branching means at each of the front and back of the workpiece, and generating two measurement lights with different frequencies.

(5) Two heterodyne interferometers that irradiate the measurement portion with one of the measurement lights, and causes an object light, which is the one of the measurement lights reflected by the measurement portion, to interfere with a reference light, which is the other of the measurement lights, at each of the front and back of the workpiece.

(6) Third optical branching means for branching each of the two measurement lights into two lights including a main light, which is input to the heterodyne interferometer, and a sub-light, which is other than the main light, at each of the front and back of the workpiece.

(7) Sub-light interfering means for causing the two sub-lights branched by the third optical branching means to interfere with each other, at each of the front and back of the workpiece.

(8) Measurement optical system holding means for integrally holding a measurement optical system including the second optical branching means, the optical modulating means, the heterodyne interferometers, the third optical branching means, and the sub-light interfering means, at each of the front and back of the workpiece.

(9) Measurement light intensity detecting means for receiving interfering lights obtained by the two heterodyne interferometers and outputting intensity signals of the interfering lights.

(10) Reference light intensity detecting means for receiving an interfering light obtained by the sub-light interfering means and outputting an intensity signal of the interfering light, at each of the front and back of the workpiece.

(11) Phase information detecting means for detecting phases of two beat signals including an output signal of the measurement light intensity detecting means and an output signal of the reference light intensity detecting means, and detecting a phase difference between the two beat signals, at each of the front and back of the workpiece.

With the above-described profile measuring apparatus including such components, by the principle of a known heterodyne interferometer, the phases of the detection signals (beat signals) by the measurement light intensity detecting means corresponding to the front and back heterodyne interferometers are determined in accordance with the height of the measurement portions facing each other at the front and back of the workpiece. Also, the phase difference between the two beat signals detected by the phase information detecting means at each of the measurement portions at the front and back of the workpiece represents the distance from the heterodyne interferometer to the measurement portion, i.e., the height of the measurement portion. Thus, the measurement value of the thickness of the workpiece can be obtained from the difference between the detection results of the phase information detecting means at the front and back of the workpiece. Further, with the above-described profile measuring apparatus, the branched lights from the single source light emitted from the light source are guided to positions near the measurement portions at the front and back surfaces of the workpiece, and then are converted by the optical modulating means into two-type measurement lights that are input to the heterodyne interferometers. Accordingly, fluctuation is not generated in phases of the two-type measurement lights in the optical paths of the branched lights from the light source to the front and back heterodyne interferometers. Also, the measurement optical system that transmits the two-type measurement lights generated by the optical modulating means is integrally held at each of the front and back of the workpiece. Therefore, the fluctuation in phases of the two-type measurement lights, which may be generated in the measurement optical system, is restricted to be very small. Also, the measurement value of the thickness of the workpiece obtained as described above is a measurement value in which components of displacements due to vibration of the workpiece at the front and back of the workpiece are canceled with each other. Accordingly, the above-described profile measuring apparatus can measure the thickness of the workpiece without being affected by the vibration of the workpiece. Also, in the measurement optical system, even if the fluctuation is slightly generated in phases of the two-type measurement lights, the fluctuation in phases are generated substantially equivalently in the two beat signals. Therefore, even if the fluctuation is slightly generated in phases of the two-type measurement lights, the fluctuation in phases is hardly reflected on the phase difference between the two beat signals. Thus, the above-described profile measuring apparatus can perform profile measurement with extremely high accuracy.

Also, according to other aspect, in the above-described profile measuring apparatus, the measurement optical system holding means may be preferably a rigid body including a plate-like holding portion that holds the measurement optical system in a shared manner at each of the front and back, the plate-like holding portion preferably having a through hole that allows a light propagating in the measurement optical system to pass therethrough. In this case, the measurement optical system holding means three-dimensionally holds the measurement optical system to extend over both sides of the plate-like holding portion. Accordingly, the plate-like holding portion that holds the measurement optical system can be reduced in size, and even if the small plate-like holding portion employs a relatively thin and light member, a sufficient rigidity can be provided. Thus, the measurement optical system holding means that is small and has a very simple structure can prevent that the phases of the two-type measurement lights are shifted due to deformation (bending) of the plate-like holding portion. For example, the plate-like holding portion may be a member that is reinforced such that an edge portion of the holding portion is fixed to other members.

Meanwhile, if a signal transmission path from the measurement light intensity detecting means to the phase detecting means and a signal transmission path from the reference light intensity detecting means to the phase detecting means are arranged close to each other for making the apparatus compact, extraneous radiation of electromagnetic waves generated from the one beat-signal transmission path interferes as a noise with the other beat signal, and degrades measurement accuracy. Hence, according to other aspect, the above-described profile measuring apparatus may further preferably include a component (12).

(12) A metal shield plate that is arranged between a signal transmission path from the measurement light intensity detecting means to the phase information detecting means and a signal transmission path from the reference light intensity detecting means to the phase information detecting means.

The profile measuring apparatus further including such a component can prevent that the measurement accuracy is degraded due to the extraneous radiation.

A profile measuring apparatus according to other aspect includes a light source unit that generates a measurement light; an optical branching device that branches the measurement light generated by the light source unit into a one-surface measurement light and a other-surface measurement light; a one-surface measurement unit that further branches the one-surface measurement light, which is branched by the optical branching device, into a first one-surface measurement light and a second one-surface measurement light, that generates a post-irradiation one-surface interfering light, which is obtained by optical heterodyne interference by causing a post-irradiation one-surface measurement light, which is included in the branched first one-surface measurement light and is irradiated on and reflected by one surface of a workpiece, to interfere with the branched second one-surface measurement light, and that generates a pre-irradiation one-surface interfering light, which is obtained by optical heterodyne interference by causing a pre-irradiation one-surface measurement light, which is included in the branched first one-surface measurement light and is before being irradiated on the one surface of the workpiece, to interfere with the branched second one-surface measurement light; a other-surface measurement unit that further branches the other-surface measurement light, which is branched by the optical branching device, into a first other-surface measurement light and a second other-surface measurement light, that generates a post-irradiation other-surface interfering light, which is obtained by optical heterodyne interference by causing a post-irradiation other-surface measurement light, which is included in the branched first other-surface measurement light and is irradiated on and reflected by the other surface of the workpiece, to interfere with the branched second other-surface measurement light, and that generates a pre-irradiation other-surface interfering light, which is obtained by optical heterodyne interference by causing a pre-irradiation other-surface measurement light, which is included in the branched first other-surface measurement light and is before being irradiated on the other surface of the workpiece, to interfere with the branched second other-surface measurement light; and an arithmetic unit that obtains, as a thickness of the workpiece, a distance from the one surface to the other surface of the workpiece based on a phase difference between a one-surface phase, which is obtained by detecting phases of the pre-irradiation one-surface interfering light and the post-irradiation one-surface interfering light generated by the one-surface measurement unit, and a other-surface phase, which is obtained by detecting phases of the pre-irradiation other-surface interfering light and the post-irradiation other-surface interfering light generated by the other-surface measurement unit. To generate a plurality of the post-irradiation one-surface interfering lights, the one-surface measurement unit obtains a plurality of the post-irradiation one-surface measurement lights by causing the first one-surface measurement light to be irradiated at a plurality of positions on the one surface of the workpiece and to be reflected. The arithmetic unit obtains a surface profile of the workpiece at each of the plurality of positions by obtaining a distance from a predetermined reference plane to the one surface of the workpiece based on a one-surface phase, which is obtained by detecting phases of the pre-irradiation one-surface interfering light and the post-irradiation one-surface interfering light generated by the one-surface measurement unit, at each of the plurality of positions.

With the profile measuring apparatus thus configured, the workpiece is measured by the optical heterodyne interferometry at the plurality of positions on the one surface of the workpiece. Accordingly, the thickness and surface profile, such as the height distribution, of the workpiece can be obtained by a single measurement. The profile measuring apparatus and profile measuring method with the above configuration can measure the thickness and surface profile of the workpiece with further high accuracy.

According to other aspect, the above-described profile measuring apparatus further includes a moving unit that moves the workpiece in a horizontal direction orthogonal to a thickness direction of the workpiece. While the moving unit moves the workpiece in the horizontal direction, the arithmetic unit obtains a plurality of surface profiles of the workpiece at the plurality of positions, by obtaining a surface profile of the workpiece, by obtaining a distance from a predetermined reference plane to the one surface of the workpiece based on a one-surface phase, which is obtained by detecting phases of the pre-irradiation one-surface interfering light and the post-irradiation one-surface interfering light generated by the one-surface measurement unit, at each of the plurality of positions.

With this configuration, the moving unit moves the workpiece in the horizontal direction, and the workpiece is scanned. Accordingly, the profile measuring apparatus thus configured can measure the thickness and surface profile of the workpiece with further high accuracy in the scanning range.

According to other aspect, in the above-described profile measuring apparatus, the plurality of positions are at least three positions, and the arithmetic unit obtains a curvature at each of the plurality of positions based on the distance from the predetermined reference plane to the one surface of the workpiece at each of the plurality of positions.

The profile measuring apparatus thus configured can measure the curvature of the surface of the workpiece as the surface profile of the workpiece.

According to other aspect, in the above-described profile measuring apparatus, the arithmetic unit obtains a surface height distribution of the workpiece by obtaining a plurality of the curvatures and connecting arcs obtained by the plurality of obtained curvatures.

With this configuration, the plurality of arcs obtained by the plurality of curvatures are connected. Accordingly, with the profile measuring apparatus thus configured, the surface profile of the workpiece can be reproduced.

According to other aspect, in the above-described profile measuring apparatus, the moving unit moves the workpiece in the horizontal direction such that at least two of the plurality of positions before the movement overlap two of the plurality of positions after the movement.

With this configuration, the workpiece is moved in the horizontal direction such that at least two of the plurality of positions before the movement overlap two of the plurality of positions after the movement. Accordingly, the profile measuring apparatus thus configured can easily continuously measure the surface profile of the workpiece.

According to other aspect, in the above-described profile measuring apparatus, the plurality of positions are arranged in a moving direction, and an interval between two positions adjacent to each other in the moving direction is uniform.

With this configuration, the interval between the two positions adjacent to each other in the moving direction is uniform. Accordingly, the profile measuring apparatus thus configured can easily control the moving unit, and can measure the surface profile of the workpiece at a constant interval.

According to other aspect, in the above-described profile measuring apparatus, the one-surface measurement unit includes a first one-surface diffraction grating that branches the branched first one-surface measurement light into a plurality of lights, and a second one-surface diffraction grating that branches the branched second one-surface measurement light into a plurality of lights, and that generates a plurality of the post-irradiation one-surface interfering lights, which are obtained by optical heterodyne interference by causing a plurality of post-irradiation one-surface measurement lights, which are included in the plurality of first one-surface measurement lights branched by the first one-surface diffraction grating and are irradiated on and reflected by the one surface of the workpiece, to interfere with the plurality of second one-surface measurement lights branched by the second one-surface diffraction grating.

With the profile measuring apparatus thus configured, the first one-surface measurement light can be branched into the plurality of lights by using the first one-surface diffraction grating, and the second one-surface measurement light can be branched into the plurality of lights by using the second one-surface diffraction grating. Hence, the plurality of positions can be simultaneously measured.

According to other aspect, in the above-described profile measuring apparatus, the one-surface measurement unit includes a single or plurality of first one-surface beam splitters that branch the branched first one-surface measurement light into a plurality of lights, and a single or plurality of second one-surface beam splitters that branch the branched second one-surface measurement light into a plurality of lights, and that generate a plurality of the post-irradiation one-surface interfering lights, which are obtained by optical heterodyne interference by causing the plurality of post-irradiation one-surface measurement lights, which are included in the plurality of first one-surface measurement lights branched by the first one-surface beam splitters and are irradiated on and reflected by the one surface of the workpiece, to interfere with the plurality of second one-surface measurement lights branched by the second one-surface beam splitters.

With this configuration, the first one-surface measurement lights are branched into the plurality of lights by the single or plurality of the first one-surface beam splitters, and the second one-surface measurement lights are branched into the plurality of lights by the single or plurality of the second one-surface beam splitters. Hence, the plurality of positions are simultaneously measured. Since the beam splitters are used, with the profile measuring apparatus thus configured, there is high degree of freedom in optical design and adjustment for the one-surface measurement unit. The limitation in optical design and adjustment can be reduced.

According to other aspect, in the above-described profile measuring apparatus, the one-surface measurement unit includes a one-surface optical modulator that generates a difference between frequencies of the branched first one-surface measurement light and second one-surface measurement light, and the other-surface measurement unit includes a other-surface optical modulator that generates a difference between frequencies of the branched first other-surface measurement light and second other-surface measurement light.

With this configuration, the one-surface optical modulator is provided in the one-surface measurement unit, and the other-surface optical modulator is included in the other-surface measurement unit. Accordingly, with the profile measuring apparatus thus configured, fluctuation is not generated in the phase of the light for the optical heterodyne interference in the optical path from the light source unit to the one-surface measurement unit, and fluctuation is not generated in the phase of the light for the optical heterodyne interference in the optical path from the light source unit to the other-surface measurement unit.

The present invention is based on Japanese Patent Application No. 2009-21290 filed on Feb. 2, 2009 and Japanese Patent Application No. 2010-6653 filed on Jan. 15, 2010, the entire contents of which are incorporated herein by reference.

To express the present invention, the invention has been properly and sufficiently described through the embodiments with reference to the drawings; however, it should be recognized that those skilled in the art can easily modify and/or improve the above-described embodiments. Therefore, it is interpreted that a modified embodiment or an improved embodiment that are implemented by those skilled in the art should be included in the scope of the claims unless the modified embodiment or the improved embodiment is at the level exceeding the scope of the claims.

INDUSTRIAL APPLICABILITY

The present invention is usable for a profile measuring apparatus that measures a profile of a workpiece such as a semiconductor wafer.

The invention claimed is:

1. A profile measuring apparatus used for scanning front and back surfaces of a workpiece and measuring a thickness distribution of the workpiece in a non-contact manner, comprising:

first optical branching means for branching a source light that is emitted from a predetermined light source into two lights;

optical guiding means for guiding the branched lights by the first optical branching means in directions toward measurement portions on the front and back surfaces of the workpiece, the measurement portions facing each other;

second optical branching means for further branching each of the branched lights of the source light guided in the directions toward the measurement portions on each of front and back of the workpiece into two lights;

optical modulating means for modulating a frequency or frequencies of one of or both the branched lights by the second optical branching means at each of the front and back of the workpiece, and generating two measurement lights with different frequencies;

two heterodyne interferometers that irradiate the measurement portion with one of the measurement lights, and causes an object light, which is the one of the measurement lights reflected by the measurement portion, to interfere with a reference light, which is the other of the measurement lights, at each of the front and back of the workpiece;

third optical branching means for branching each of the two measurement lights into two lights including a main light, which is input to the heterodyne interferometer, and a sub-light, which is other than the main light, at each of the front and back of the workpiece;

sub-light interfering means for causing the two sub-lights branched by the third optical branching means to interfere with each other, at each of the front and back of the workpiece;

measurement optical system holding means for integrally holding a measurement optical system including the second optical branching means, the optical modulating means, the heterodyne interferometers, the third optical branching means, and the sub-light interfering means, at each of the front and back of the workpiece;

measurement light intensity detecting means for receiving interfering lights obtained by the two heterodyne interferometers and outputting intensity signals of the interfering lights;

reference light intensity detecting means for receiving an interfering light obtained by the sub-light interfering means and outputting an intensity signal of the interfering light, at each of the front and back of the workpiece; and phase information detecting means for detecting phases of two beat signals including an output signal of the measurement light intensity detecting means and an output signal of the reference light intensity detecting means, and detecting a phase difference between the two beat signals, at each of the front and back of the workpiece.

2. The profile measuring apparatus according to claim 1, wherein the measurement optical system holding means is a rigid body including a plate-like holding portion that holds the measurement optical system in a shared manner at each of the front and back, the plate-like holding portion having a through hole that allows a light propagating in the measurement optical system to pass therethrough.

3. The profile measuring apparatus according to claim 1, further comprising:

a metal shield plate that is arranged between a signal transmission path from the measurement light intensity detecting means to the phase information detecting means and a signal transmission path from the reference light intensity detecting means to the phase information detecting means.

4. A profile measuring apparatus, comprising:

a light source unit that generates a measurement light;

an optical branching device that branches the measurement light generated by the light source unit into a one-surface measurement light and a other-surface measurement light;

a one-surface measurement unit that further branches the one-surface measurement light, which is branched by the optical branching device, into a first one-surface measurement light and a second one-surface measurement light, that generates a post-irradiation one-surface interfering light, which is obtained by optical heterodyne interference by causing a post-irradiation one-surface measurement light, which is included in the branched first one-surface measurement light and is irradiated on and reflected by one surface of a workpiece, to interfere with the branched second one-surface measurement light, and that generates a pre-irradiation one-surface interfering light, which is obtained by optical heterodyne interference by causing a pre-irradiation one-surface measurement light, which is included in the branched first one-surface measurement light and is before being irradiated on the one surface of the workpiece, to interfere with the branched second one-surface measurement light;

a other-surface measurement unit that further branches the other-surface measurement light, which is branched by the optical branching device, into a first other-surface measurement light and a second other-surface measurement light, that generates a post-irradiation other-surface interfering light, which is obtained by optical heterodyne interference by causing a post-irradiation other-surface measurement light, which is included in the branched first other-surface measurement light and is irradiated on and reflected by the other surface of the workpiece, to interfere with the branched second other-surface measurement light, and that generates a pre-irradiation other-surface interfering light, which is obtained by optical heterodyne interference by causing a pre-irradiation other-surface measurement light, which is included in the branched first other-surface measurement light and is before being irradiated on the other surface of the workpiece, to interfere with the branched second other-surface measurement light; and an arithmetic unit that obtains, as a thickness of the workpiece, a distance from the one surface to the other surface of the workpiece based on a phase difference between a one-surface phase, which is obtained by detecting phases of the pre-irradiation one-surface interfering light and the post-irradiation one-surface interfering light generated by the one-surface measurement unit, and a other-surface phase, which is obtained by detecting phases of the pre-irradiation other-surface interfering light and the post-irradiation other-surface interfering light generated by the other-surface measurement unit, wherein, to generate a plurality of the post-irradiation one-surface interfering lights, the one-surface measurement unit obtains a plurality of the post-irradiation one-surface measurement lights by causing the first one-surface measurement light to be irradiated at a plurality of positions on the one surface of the workpiece and to be reflected, and wherein the arithmetic unit obtains a surface profile of the workpiece at each of the plurality of positions by obtaining a distance from a predetermined reference plane to the one surface of the workpiece based on a one-surface phase, which is obtained by detecting phases of the pre-irradiation one-surface interfering light and the post-irradiation one-surface interfering light generated by the one-surface measurement unit, at each of the plurality of positions.

5. The profile measuring apparatus according to claim 4, further comprising:

a moving unit that moves the workpiece in a horizontal direction orthogonal to a thickness direction of the workpiece, wherein, while the moving unit moves the workpiece in the horizontal direction, the arithmetic unit obtains a plurality of surface profiles of the workpiece at the plurality of positions, by obtaining a surface profile of the workpiece, by obtaining a distance from a predetermined reference plane to the one surface of the workpiece based on a one-surface phase, which is obtained by detecting phases of the pre-irradiation one-surface interfering light and the post-irradiation one-surface interfering light generated by the one-surface measurement unit, at each of the plurality of positions.

6. The profile measuring apparatus according to claim 4, wherein the plurality of positions are at least three positions, and wherein the arithmetic unit obtains a curvature at each of the plurality of positions based on the distance from the predetermined reference plane to the one surface of the workpiece at each of the plurality of positions.

7. The profile measuring apparatus according to claim 6, wherein the arithmetic unit obtains a surface height distribution of the workpiece by obtaining a plurality of the curvatures and connecting arcs obtained by the plurality of obtained curvatures.

8. The profile measuring apparatus according to claim 5, wherein the moving unit moves the workpiece in the horizontal direction such that at least two of the plurality of positions before the movement overlap two of the plurality of positions after the movement.

9. The profile measuring apparatus according to claim 5, wherein the plurality of positions are arranged in a moving direction, and an interval between two positions adjacent to each other in the moving direction is uniform.

10. The profile measuring apparatus according to claim 4, wherein the one-surface measurement unit includes a first one-surface diffraction grating that branches the branched first one-surface measurement light into a plurality of lights, and a second one-surface diffraction grating that branches the branched second one-surface measurement light into a plurality of lights, and that generates a plurality of the post-irradiation one-surface interfering lights, which are obtained by optical heterodyne interference by causing a plurality of post-irradiation one-surface measurement lights, which are included in the plurality of first one-surface measurement lights branched by the first one-surface diffraction grating and are irradiated on and reflected by the one surface of the workpiece, to interfere with the plurality of second one-surface measurement lights branched by the second one-surface diffraction grating.

11. The profile measuring apparatus according to claim 4, wherein the one-surface measurement unit includes a single or plurality of first one-surface beam splitters that branch the branched first one-surface measurement light into a plurality of lights, and a single or plurality of second one-surface beam splitters that branch the branched second one-surface measurement light into a plurality of lights, and that generate a plurality of the post-irradiation one-surface interfering lights, which are obtained by optical heterodyne interference by causing the plurality of post-irradiation one-surface measurement lights, which are included in the plurality of first one-surface measurement lights branched by the first one-surface beam splitters and are irradiated on and reflected by the one surface of the workpiece, to interfere with the plurality of second one-surface measurement lights branched by the second one-surface beam splitters.

12. The profile measuring apparatus according to claim 4, wherein the one-surface measurement unit includes a one-surface optical modulator that generates a difference between frequencies of the branched first one-surface measurement light and second one-surface measurement light, and wherein the other-surface measurement unit includes a other-surface optical modulator that generates a difference between frequencies of the branched first other-surface measurement light and second other-surface measurement light.

* * * * *